(12) United States Patent
Garcia-Luna-Aceves

(10) Patent No.: US 10,333,840 B2
(45) Date of Patent: Jun. 25, 2019

(54) SYSTEM AND METHOD FOR ON-DEMAND CONTENT EXCHANGE WITH ADAPTIVE NAMING IN INFORMATION-CENTRIC NETWORKS

(71) Applicant: CISCO TECHNOLOGY, INC., San Jose, CA (US)

(72) Inventor: Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 555 days.

(21) Appl. No.: 14/616,371

(22) Filed: Feb. 6, 2015

(65) Prior Publication Data

US 2016/0234110 A1    Aug. 11, 2016

(51) Int. Cl.
| | | |
|---|---|---|
| *H04L 12/741* | (2013.01) | |
| *H04L 29/08* | (2006.01) | |
| *H04L 12/773* | (2013.01) | |
| *H04L 12/725* | (2013.01) | |
| *H04L 12/733* | (2013.01) | |

(52) U.S. Cl.
CPC .............. *H04L 45/74* (2013.01); *H04L 45/20* (2013.01); *H04L 45/306* (2013.01); *H04L 45/60* (2013.01); *H04L 67/327* (2013.01); *H04L 67/2842* (2013.01)

(58) Field of Classification Search
CPC ....... H04L 45/50; H04L 45/306; H04L 45/12; H04L 45/38; H04L 45/74; H04L 67/327; H04L 45/34; H04L 45/742
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Hop (networking), Wikipedia, Jan. 9, 2015. (Year: 2015).*

(Continued)

*Primary Examiner* — Vivek Srivastava
*Assistant Examiner* — Muhammad Raza

(57) ABSTRACT

One embodiment of the present invention provides a system for content exchange in an information-centric network (ICN). During operation, a first node in the ICN receives an interest for a piece of content from a second node. The interest indicates a name of the piece of content and an incoming identifier assigned to the interest by the second node. The system identifies a matching entry in an identifier table stored on the first node that corresponds to the incoming identifier. The matching entry indicates a next-hop neighbor and an outgoing identifier. The system then updates the interest by replacing the incoming identifier with the outgoing identifier, and forwards the updated interest to the next-hop neighbor.

20 Claims, 12 Drawing Sheets

(56) References Cited

U.S. PATENT DOCUMENTS

| | | | |
|---|---|---|---|
| 5,214,702 A | 5/1993 | Fischer | |
| 5,377,354 A | 12/1994 | Scannell | |
| 5,506,844 A | 4/1996 | Rao | |
| 5,629,370 A | 5/1997 | Freidzon | |
| 5,845,207 A | 12/1998 | Amin | |
| 5,870,605 A | 2/1999 | Bracho | |
| 6,021,464 A | 2/2000 | Yao | |
| 6,047,331 A | 4/2000 | Medard | |
| 6,052,683 A | 4/2000 | Irwin | |
| 6,085,320 A | 7/2000 | Kaliski, Jr. | |
| 6,091,724 A | 7/2000 | Chandra | |
| 6,104,695 A * | 8/2000 | Wesley | H04L 12/1868 370/216 |
| 6,128,623 A | 10/2000 | Mattis | |
| 6,128,627 A | 10/2000 | Mattis | |
| 6,173,364 B1 | 1/2001 | Zenchelsky | |
| 6,209,003 B1 | 3/2001 | Mattis | |
| 6,226,618 B1 | 5/2001 | Downs | |
| 6,233,617 B1 | 5/2001 | Rothwein | |
| 6,233,646 B1 | 5/2001 | Hahm | |
| 6,289,358 B1 | 9/2001 | Mattis | |
| 6,292,880 B1 | 9/2001 | Mattis | |
| 6,332,158 B1 | 12/2001 | Risley | |
| 6,363,067 B1 | 3/2002 | Chung | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,732,273 B1 | 5/2004 | Byers | |
| 6,769,066 B1 | 7/2004 | Botros | |
| 6,772,333 B1 | 8/2004 | Brendel | |
| 6,775,258 B1 | 8/2004 | vanValkenburg | |
| 6,834,272 B1 | 12/2004 | Naor | |
| 6,862,280 B1 | 3/2005 | Bertagna | |
| 6,901,452 B1 | 5/2005 | Bertagna | |
| 6,915,307 B1 | 7/2005 | Mattis | |
| 6,917,985 B2 | 7/2005 | Madruga | |
| 6,957,228 B1 | 10/2005 | Graser | |
| 6,968,393 B1 | 11/2005 | Chen | |
| 6,981,029 B1 | 12/2005 | Menditto | |
| 7,007,024 B2 | 2/2006 | Zelenka | |
| 7,013,389 B1 | 3/2006 | Srivastava | |
| 7,031,308 B2 | 4/2006 | Garcia-Luna-Aceves | |
| 7,043,637 B2 | 5/2006 | Bolosky | |
| 7,061,877 B1 | 6/2006 | Gummalla | |
| 7,076,559 B1 * | 7/2006 | Ghanwani | H04L 45/50 370/352 |
| 7,080,073 B1 | 7/2006 | Jiang | |
| 7,088,721 B1 * | 8/2006 | Droz | H04Q 11/0478 370/389 |
| RE39,360 E | 10/2006 | Aziz | |
| 7,149,750 B2 | 12/2006 | Chadwick | |
| 7,152,094 B1 | 12/2006 | Jannu | |
| 7,177,646 B2 | 2/2007 | ONeill | |
| 7,206,860 B2 | 4/2007 | Murakami | |
| 7,206,861 B1 | 4/2007 | Callon | |
| 7,210,326 B2 | 5/2007 | Kawamoto | |
| 7,233,948 B1 | 6/2007 | Shamoon | |
| 7,246,159 B2 | 7/2007 | Aggarwal | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,362,727 B1 | 4/2008 | ONeill | |
| 7,382,787 B1 | 6/2008 | Barnes | |
| 7,395,507 B2 | 7/2008 | Robarts | |
| 7,430,755 B1 | 9/2008 | Hughes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,535,926 B1 | 5/2009 | Deshpande | |
| 7,542,471 B2 | 6/2009 | Samuels | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,564,812 B1 | 7/2009 | Elliott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,636,767 B2 | 12/2009 | Lev-Ran | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,698,559 B1 | 4/2010 | Chaudhury | |
| 7,769,887 B1 | 8/2010 | Bhattacharyya | |
| 7,779,467 B2 | 8/2010 | Choi | |
| 7,801,069 B2 | 9/2010 | Cheung | |
| 7,801,177 B2 | 9/2010 | Luss | |
| 7,816,441 B2 | 10/2010 | Elizalde | |
| 7,831,733 B2 | 11/2010 | Sultan | |
| 7,873,619 B1 | 1/2011 | Faibish | |
| 7,908,337 B2 | 3/2011 | Garcia-Luna-Aceves | |
| 7,924,837 B1 | 4/2011 | Shabtay | |
| 7,953,014 B2 | 5/2011 | Toda | |
| 7,953,885 B1 | 5/2011 | Devireddy | |
| 7,979,912 B1 | 7/2011 | Roka | |
| 8,000,267 B2 | 8/2011 | Solis | |
| 8,010,691 B2 | 8/2011 | Kollmansberger | |
| 8,069,023 B1 | 11/2011 | Frailong | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,239,331 B2 | 8/2012 | Shanmugavelayutham | |
| 8,271,578 B2 | 9/2012 | Sheffi | |
| 8,271,687 B2 | 9/2012 | Turner | |
| 8,312,064 B1 | 11/2012 | Gauvin | |
| 8,332,357 B1 | 12/2012 | Chung | |
| 8,375,420 B2 | 2/2013 | Farrell | |
| 8,386,622 B2 | 2/2013 | Jacobson | |
| 8,447,851 B1 | 5/2013 | Anderson | |
| 8,462,781 B2 | 6/2013 | McGhee | |
| 8,467,297 B2 | 6/2013 | Liu | |
| 8,473,633 B2 | 6/2013 | Eardley | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,677,451 B1 | 3/2014 | Bhimaraju | |
| 8,688,619 B1 | 4/2014 | Ezick | |
| 8,699,350 B1 | 4/2014 | Kumar | |
| 8,718,055 B2 | 5/2014 | Vasseur | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,861,356 B2 | 10/2014 | Kozat | |
| 8,862,774 B2 | 10/2014 | Vasseur | |
| 8,868,779 B2 | 10/2014 | ONeill | |
| 8,874,842 B1 | 10/2014 | Kimmel | |
| 8,880,682 B2 | 11/2014 | Bishop | |
| 8,903,756 B2 | 12/2014 | Zhao | |
| 8,923,293 B2 | 12/2014 | Jacobson | |
| 8,934,496 B2 | 1/2015 | Vasseur | |
| 8,937,865 B1 | 1/2015 | Kumar | |

(56) References Cited

U.S. PATENT DOCUMENTS

| | | |
|---|---|---|
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,590,948 B2 * | 3/2017 | Mosko ............... H04L 61/3005 |
| 9,794,148 B1 * | 10/2017 | Ramachandran ....... H04L 45/22 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0110119 A1 * | 8/2002 | Fredette ............. H04Q 11/0478 |
| | | 370/389 |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0165601 A1 * | 8/2004 | Liu ......................... H04L 45/00 |
| | | 370/401 |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0198367 A1 * | 9/2005 | Ettikan ............. H04L 29/12009 |
| | | 709/238 |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0233155 A1 * | 10/2006 | Srivastava ............. H04L 45/00 |
| | | 370/351 |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |

(56) References Cited

U.S. PATENT DOCUMENTS

| | | |
|---|---|---|
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0043068 A1* | 2/2010 | Varadhan ............ H04L 12/4633 726/15 |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0290344 A1* | 11/2010 | Meloche ................. H04L 41/12 370/241 |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |

(56) References Cited

U.S. PATENT DOCUMENTS

| | | | |
|---|---|---|---|
| 2012/0221150 A1 | 8/2012 | Arensmeier | |
| 2012/0224487 A1 | 9/2012 | Hui | |
| 2012/0226902 A1 | 9/2012 | Kim | |
| 2012/0257500 A1 | 10/2012 | Lynch | |
| 2012/0284791 A1 | 11/2012 | Miller | |
| 2012/0290669 A1 | 11/2012 | Parks | |
| 2012/0290919 A1 | 11/2012 | Melnyk | |
| 2012/0291102 A1 | 11/2012 | Cohen | |
| 2012/0300669 A1 | 11/2012 | Zahavi | |
| 2012/0307629 A1 | 12/2012 | Vasseur | |
| 2012/0314580 A1 | 12/2012 | Hong | |
| 2012/0317307 A1 | 12/2012 | Ravindran | |
| 2012/0317655 A1 | 12/2012 | Zhang | |
| 2012/0322422 A1 | 12/2012 | Frecks | |
| 2012/0323933 A1 | 12/2012 | He | |
| 2012/0331112 A1 | 12/2012 | Chatani | |
| 2013/0024560 A1 | 1/2013 | Vasseur | |
| 2013/0041982 A1 | 2/2013 | Shi | |
| 2013/0051392 A1 | 2/2013 | Filsfils | |
| 2013/0054971 A1 | 2/2013 | Yamaguchi | |
| 2013/0060962 A1 | 3/2013 | Wang | |
| 2013/0061084 A1 | 3/2013 | Barton | |
| 2013/0066823 A1 | 3/2013 | Sweeney | |
| 2013/0073552 A1 | 3/2013 | Rangwala | |
| 2013/0073882 A1 | 3/2013 | Inbaraj | |
| 2013/0074155 A1 | 3/2013 | Huh | |
| 2013/0090942 A1 | 4/2013 | Robinson | |
| 2013/0091237 A1 | 4/2013 | Ambalavanar | |
| 2013/0091539 A1 | 4/2013 | Khurana | |
| 2013/0110987 A1 | 5/2013 | Kim | |
| 2013/0111063 A1 | 5/2013 | Lee | |
| 2013/0128786 A1 | 5/2013 | Sultan | |
| 2013/0132719 A1 | 5/2013 | Kobayashi | |
| 2013/0139245 A1 | 5/2013 | Thomas | |
| 2013/0151584 A1 | 6/2013 | Westphal | |
| 2013/0151646 A1 | 6/2013 | Chidambaram | |
| 2013/0152070 A1 | 6/2013 | Bhullar | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0182931 A1 | 7/2013 | Fan | |
| 2013/0185406 A1 | 7/2013 | Choi | |
| 2013/0191412 A1 | 7/2013 | Kitamura | |
| 2013/0197698 A1 | 8/2013 | Shah | |
| 2013/0198119 A1 | 8/2013 | Eberhardt, III | |
| 2013/0212185 A1 | 8/2013 | Pasquero | |
| 2013/0219038 A1 | 8/2013 | Lee | |
| 2013/0219081 A1 | 8/2013 | Qian | |
| 2013/0219478 A1 | 8/2013 | Mahamuni | |
| 2013/0223237 A1 | 8/2013 | Hui | |
| 2013/0227048 A1 | 8/2013 | Xie | |
| 2013/0227114 A1 | 8/2013 | Vasseur | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0262365 A1 | 10/2013 | Dolbear | |
| 2013/0262698 A1 | 10/2013 | Schwan | |
| 2013/0275544 A1 | 10/2013 | Westphal | |
| 2013/0282854 A1 | 10/2013 | Jang | |
| 2013/0282860 A1 | 10/2013 | Zhang | |
| 2013/0282920 A1 | 10/2013 | Zhang | |
| 2013/0304758 A1 | 11/2013 | Gruber | |
| 2013/0304937 A1 | 11/2013 | Lee | |
| 2013/0325888 A1 | 12/2013 | Oneppo | |
| 2013/0329696 A1 | 12/2013 | Xu | |
| 2013/0332971 A1 | 12/2013 | Fisher | |
| 2013/0336103 A1 | 12/2013 | Vasseur | |
| 2013/0336323 A1 | 12/2013 | Srinivasan | |
| 2013/0339481 A1 | 12/2013 | Hong | |
| 2013/0343408 A1 | 12/2013 | Cook | |
| 2014/0003232 A1 | 1/2014 | Guichard | |
| 2014/0003424 A1 | 1/2014 | Matsuhira | |
| 2014/0006354 A1 | 1/2014 | Parkison | |
| 2014/0006565 A1 | 1/2014 | Muscariello | |
| 2014/0023072 A1 | 1/2014 | Lee et al. | |
| 2014/0023076 A1* | 1/2014 | Calo | H04L 45/34 370/392 |
| 2014/0029445 A1 | 1/2014 | Hui | |
| 2014/0032714 A1 | 1/2014 | Liu | |
| 2014/0033193 A1 | 1/2014 | Palaniappan | |
| 2014/0040505 A1 | 2/2014 | Barton | |
| 2014/0040628 A1 | 2/2014 | Fort | |
| 2014/0043987 A1 | 2/2014 | Watve | |
| 2014/0047513 A1 | 2/2014 | vantNoordende | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0082661 A1 | 3/2014 | Krahnstoever | |
| 2014/0089454 A1 | 3/2014 | Jeon | |
| 2014/0096249 A1 | 4/2014 | Dupont | |
| 2014/0098675 A1* | 4/2014 | Frost | H04L 69/166 370/241.1 |
| 2014/0098685 A1 | 4/2014 | Shattil | |
| 2014/0108313 A1 | 4/2014 | Heidasch | |
| 2014/0108474 A1 | 4/2014 | David | |
| 2014/0115037 A1 | 4/2014 | Liu | |
| 2014/0122587 A1 | 5/2014 | Petker et al. | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0237095 A1 | 5/2014 | Petker | |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0173076 A1 | 6/2014 | Ravindran | |
| 2014/0181140 A1 | 6/2014 | Kim | |
| 2014/0185618 A1* | 7/2014 | Perlman | H04L 45/745 370/392 |
| 2014/0192677 A1 | 7/2014 | Chew | |
| 2014/0192717 A1 | 7/2014 | Liu | |
| 2014/0195328 A1 | 7/2014 | Ferens | |
| 2014/0195641 A1 | 7/2014 | Wang | |
| 2014/0195666 A1 | 7/2014 | Dumitriu | |
| 2014/0204945 A1 | 7/2014 | Byun | |
| 2014/0207954 A1* | 7/2014 | Calo | H04L 67/1029 709/226 |
| 2014/0214942 A1 | 7/2014 | Ozonat | |
| 2014/0233575 A1 | 8/2014 | Xie | |
| 2014/0237085 A1 | 8/2014 | Park | |
| 2014/0245359 A1 | 8/2014 | DeFoy | |
| 2014/0254595 A1 | 9/2014 | Luo | |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0297844 A1* | 10/2014 | Kancherla | H04L 43/0894 709/224 |
| 2014/0298248 A1 | 10/2014 | Kang | |
| 2014/0314093 A1 | 10/2014 | You | |
| 2014/0337276 A1 | 11/2014 | Iordanov | |
| 2014/0348161 A1* | 11/2014 | Koponen | H04L 45/64 370/389 |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0033365 A1 | 1/2015 | Mellor | |
| 2015/0039890 A1 | 2/2015 | Khosravi | |
| 2015/0063802 A1 | 3/2015 | Bahadur | |
| 2015/0089081 A1 | 3/2015 | Thubert | |
| 2015/0095481 A1 | 4/2015 | Ohnishi | |
| 2015/0095514 A1 | 4/2015 | Yu | |
| 2015/0120663 A1 | 4/2015 | LeScouarnec | |
| 2015/0169758 A1 | 6/2015 | Assom | |
| 2015/0188770 A1 | 7/2015 | Naiksatam | |
| 2015/0195149 A1 | 7/2015 | Vasseur | |

(56) References Cited

U.S. PATENT DOCUMENTS

| | | | |
|---|---|---|---|
| 2015/0207633 | A1 | 7/2015 | Ravindran |
| 2015/0207864 | A1 | 7/2015 | Wilson |
| 2015/0222479 | A1* | 8/2015 | Kim .................. H04W 28/0236 |
| | | | 370/218 |
| 2015/0279348 | A1 | 10/2015 | Cao |
| 2015/0288755 | A1 | 10/2015 | Mosko |
| 2015/0312300 | A1 | 10/2015 | Mosko |
| 2015/0349961 | A1 | 12/2015 | Mosko |
| 2015/0372903 | A1 | 12/2015 | Hui |
| 2015/0381546 | A1 | 12/2015 | Mahadevan |
| 2016/0019275 | A1 | 1/2016 | Mosko |
| 2016/0021172 | A1 | 1/2016 | Mahadevan |
| 2016/0062840 | A1 | 3/2016 | Scott |
| 2016/0110466 | A1 | 4/2016 | Uzun |
| 2016/0171184 | A1 | 6/2016 | Solis |
| 2016/0212066 | A1* | 7/2016 | Ravindran .............. H04L 47/80 |
| 2016/0255535 | A1* | 9/2016 | De Foy ............... H04L 67/2804 |
| | | | 370/236 |

FOREIGN PATENT DOCUMENTS

| | | | |
|---|---|---|---|
| DE | 19620817 | A1 | 11/1997 |
| EP | 0295727 | A2 | 12/1988 |
| EP | 0757065 | A2 | 7/1996 |
| EP | 1077422 | A2 | 2/2001 |
| EP | 1383265 | A1 | 1/2004 |
| EP | 1384729 | A1 | 1/2004 |
| EP | 1473889 | A2 | 11/2004 |
| EP | 2120402 | | 11/2009 |
| EP | 2120419 | | 11/2009 |
| EP | 2120419 | A2 | 11/2009 |
| EP | 2124415 | A2 | 11/2009 |
| EP | 2214357 | A1 | 8/2010 |
| EP | 2299754 | A1 | 3/2011 |
| EP | 2323346 | | 5/2011 |
| EP | 2552083 | | 1/2013 |
| EP | 2214356 | | 5/2016 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2005041527 | | 5/2005 |
| WO | 2007113180 | A1 | 10/2007 |
| WO | 2007122620 | | 11/2007 |
| WO | 2007144388 | A1 | 12/2007 |
| WO | 2011049890 | A1 | 4/2011 |
| WO | 2012077073 | A1 | 6/2012 |
| WO | 2013123410 | | 8/2013 |
| WO | 2014023072 | | 2/2014 |
| WO | 2015084327 | | 6/2015 |

OTHER PUBLICATIONS

Ahlgren et al., A Survey of Information-Centric Networking, Jul. 2012, IEEE, pp. 26-36. (Year: 2012).*
Ming et al., Age-based Cooperative Caching in Information-Centric Networking, 2014, IEEE, pp. 1-8. (Year: 2014).*
Blefari-Melazzi et al., An OpenFlow-based Testbed for Information Centric Networking, 2012, Future Network & MobileSummit, pp. 1-9. (Year: 2012).*
Chiocchetti et al., INFORM: a dynamic INterest FORwarding Mechanism for Information Centric Networking, Aug. 12, 2013, ACM, pp. 9-14. (Year: 2013).*
Dannewitz et al., Network of Information (NetInf)—An information-centric networking architecture, Jan. 27, 2013, Elsevier, pp. 721-735. (Year: 2013).*
Multiprotocol Label Switching, Wikipedia, Jan. 9, 2015. (Year: 2015).*
Xie et al. "Collaborative Forwarding and Caching in Content Centric Networks", Networking 2012.
Carzaniga, Antonio, Matthew J. Rutherford, and Alexander L. Wolf. "A routing scheme for content-based networking." INFOCOM 2004. Twenty-third AnnualJoint Conference of the IEEE Computer and Communications Societies. vol. 2. IEEE, 2004.
Ahlgren, Bengt, et al. "A survey of information-centric networking." Communications Magazine, IEEE 50.7 (2012): 26-36.
Content Centric Networking Project (CCN) {online} http://www.ccnx.org/releases/latest/doc/technical.
Bari, MdFaizul, et al. "A survey of naming and routing in information-centric networks." Communications Magazine, IEEE 50.12 (2012): 44-53.
Jacobson, Van, et al. "Networking named content." Proceedings of the 5th international conference on Emerging networking experiments and technologies. ACM, 2009.
Hogue, A. K. M., et al. "Nlsr: Named-data link state routing protocol." Proceedings of the 3rd ACM SIGCOMM Workshop on Information-centric Networking. ACM, 2013.
NDN Project {online} http://www.named-data.net/.
Xylomenos, George, et al. "A survey of information-centric networking research." Communications Surveys & Tutorials, IEEE 16.2 (2014): 1024-1049.
Dabirmoghaddam, Ali, Maziar Mirzazad Barijough, and J. J. Garcia-Luna-Aceves. "Understanding optimal caching and opportunistic caching at the edge of information-centric networks." Proceedings of the 1st international conference on Information-centric networking. ACM, 2014.
Dijkstra, Edsger W., and Carel S. Scholten. "Termination detection for diffusing computations." Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
Garcia-Luna-Aceves, Jose J. "A unified approach to loop-free routing using distance vectors or link states." ACM SIGCOMM Computer Communication Review. vol. 19. No. 4. ACM, 1989.
Garcia-Luna-Aceves, Jose J. "Name-Based Content Routing in Information Centric Networks Using Distance Information" Proc ACM ICN 2014, Sep. 2014.
Gritter, Mark, and David R. Cheriton. "An Architecture for Content Routing Support in the Internet." USITS. vol. 1. 2001.
Intanagonwiwat, Chalermek, Ramesh Govindan, and Deborah Estrin. "Directed diffusion: a scalable and robust communication paradigm for sensor networks." Proceedings of the 6th annual international conference on Mobile computing and networking. ACM, 2000.
Koponen, Teemu, et al. "A data-oriented (and beyond) network architecture." ACM SIGCOMM Computer Communication Review. vol. 37. No. 4. ACM, 2007.
Matocha, Jeff, and Tracy Camp. "A taxonomy of distributed termination detection algorithms." Journal of Systems and Software 43.3 (1998): 207-221.
Solis, Ignacio, and J. J. Garcia-Luna-Aceves. "Robust content dissemination in disrupted environments." proceedings of the third ACM workshop on Challenged networks. ACM, 2008.
Vutukury, Srinivas, and J. J. Garcia-Luna-Aceves. A simple approximation to minimum-delay routing. vol. 29. No. 4. ACM, 1999.
Yi, Cheng, et al. "Adaptive forwarding in named data networking." ACM SIGCOMM computer communication review 42.3 (2012): 62-67.
Yi, Cheng, et al. "A case for stateful forwarding plane." Computer Communications 36.7 (2013): 779-791.
Zhang, Lixia, et al. "Named data networking." ACM SIGCOMM Computer Communication Review 44.3 (2014): 66-73.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
"CCNx," http://ccnx.org/. downloaded Mar. 11, 2015.

(56) References Cited

OTHER PUBLICATIONS

"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub Internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Lynn$2E.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Mediator Architecture for Content-aware Networks (COMET) Project [online], http://www.comet.project.org/, Downloaded Mar. 9, 2015.
D. Boneh, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Detti et al., "Supporting the Web with an information centric network that routes by name", Aug. 2012, Computer Networks 56, pp. 3705-3702.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.

(56) References Cited

OTHER PUBLICATIONS

Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/426Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

(56) References Cited

OTHER PUBLICATIONS

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, Paragraph [002] figure 1.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] paragraphs [003]-[006], [0011], [0013] figures 1,2.
Marc Mosko et al "All-In-One Streams for Content Centric Networks", May 24, 2015, retrieved from the Internet: http://www.ccnx.org/pubs/AllinOne.pdf [downloaded Jun. 9, 2016]the whole document.
Cesar Ghali et al. "Elements of Trust in Named-Data Networking", Feb. 13, 2014 Retrieved from the internet Jun. 17, 2016 http://arxiv.org/pdf/ 1402.3332v5.pdf p. 5, col. 1 p. 2, col. 1-2 Section 4.1; p. 4, col. 2 Section 4.2; p. 4, col. 2.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 The Whole Document.
Sun et al.: "Content-Based Route Lookup Using CAMs", Global Communications Conference, IEEE, Dec. 3, 2012 The Whole Document.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, last paragraph of section II.B.
Smetters et al. "Securing Network Content" Technical Report, PARC TR-2009-1, Oct. 1 2009, Retrieved from the internet URL:http://www.parc.com/content/attachments/TR-2009-01.pdf [retrieved Nov. 1, 2016].
Marc Mosko "CCNx Label Forwarding (CCNLF)" Jul. 21, 2014.

(56) References Cited

OTHER PUBLICATIONS

Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Extended European Search Report in counterpart European Application No. 16151709.9, dated May 25, 2016, 8 pages.

\* cited by examiner

FORWARDING INFORMATION BASE 200

| NAME PREFIX | NEXT HOP | HOP COUNT | ANCHOR | MIN HOP COUNT |
|---|---|---|---|---|
| $n(1)^*$ | $S_{n(1)^*}^i$ | $h(i, n(1)^*, q)$, q belongs to $S_{n(1)^*}^i$ | $a(i, n(1)^*, q)$ | $h(i, n(1)^*)$ |
| ... | ... | ... | ... | ... |
| $n(j)^*$ | $S_{n(j)^*}^i$ | $h(i, n(j)^*, q)$, q belongs to $S_{n(j)^*}^i$ | $a(i, n(j)^*, q)$ | $h(i, n(j)^*)$ |
| ... | | | | |

DATA-ANSWER ROUTING TABLE 300

| INTERFACE | PREDECESSOR dart | SUCCESSOR | SUCCESSOR dart | HOP COUNT | LIFETIME |
|---|---|---|---|---|---|
| $p$ | $pdt^i_p(dt^i(p))$ | $s^i_p(dt^i(p))$ | $sdt^i_p(dt^i(p))$ | $h^i_p(dt^i(p))$ | $LT^i_p(dt^i(p))$ |
| ... | ... | ... | ... | ... | ... |
| $q$ | $pdt^i_q(dt^i(q))$ | $s^i_q(dt^i(q))$ | $sdt^i_q(dt^i(q))$ | $h^i_q(dt^i(q))$ 302 | $LT^i_q(dt^i(q))$ |
| ... | ... | ... | ... | ... | ... |

Interest-Processing Algorithm at Router $i$

1: function Process Interest
2: INPUT: $CS^i$, $FIB^i$, $DART_k^i$, $I[n(j), h^I(k), dt^I(k)]$;
3: if $n(j) \in CS^i$ then
4:     Send $D[n(j), sig(j), dt^I(k)]$ to $k$
5: else
6:     if $pdt_k^i(dt^I(k)) \in DART_k^i$ then
7:         %Interest can be forwarded using the successor dart corresponding to predecessor dart $pdt_k^i(dt^I(k))$;
            $h^I(i) = h_k^i(dt^I(k))$; $dt^I(i) = sdt_k^i(dt^I(k))$;
            forward $I[n(j), h^I(i), dt^I(i)]$ to $s_k^i(dt^I(k))$;
8:     else
9:         if $n(j)^* \notin FIB^i$ then
10:             % No route exists to $n(j)^*$:
                send $NI[n(j), \text{no route}, dt^I(k)]$ to $k$;
                drop $I[n(j), h^I(k), dt^I(k)]$
11:         else
12:             for each $v \in S_{n(j)^*}^i$ by rank do
13:                 if $h^I(k) > h(i, n(j)^*, v)$ then
14:                     % Interest can be forwarded to $v$:
                        $h^I(i) = h(i, n(j)^*, v)$;
                        call Create Dart ($DART_k^i, dt^I(k)$);
                        $dt^I(i) = sdt_k^i(dt^I(k))$;
                        $h^I(i) = h_k^i(dt^I(k))$;
                        forward $I[n(j), h^I(i), dt^I(i)]$ to $v$
15:                 end if
16:             end for
17:             % $\nexists v \in S_{n(j)^*}^i (h^I(k) > h(i, n(j)^*, v))$
                % and Interest may be traversing a loop:
                send $NI[n(j), \text{loop}, dt^I(k)]$ to $k$;
                drop $I[n(j), h^I(k), dt^I(k)]$
18:         end if
19:     end if
20: end if
21: end function

FIG. 6

Algorithm for Creating a DART entry at Router $i$

1: function Create Dart
2: INPUT: $dt^I(k), DART_k^i, v, n(j)^*, FIB^i, MLT$;
3: create entry $DART_k^i(dt^I(k))$ with:
   $pdt_k^i(dt^I(k)) = dt^I(k)$;
   $s_k^i(dt^I(k)) = v$;
   $p[dt^I(i)] = f[dt^I(k)]$;
   $f[dt^I(i)] = lid(DART_k^i)$;
   $a[dt^I(i)] = a(i, n(j)^*, v)$;
   $sdt_k^i(dt^I(k)) = p[dt^I(i)]$ & $f[dt^I(i)]$ & $a[dt^I(i)]$;
   $h_k^i(dt^I(k)) = h(i, n(j)^*, v)$;
   $LT_k^i(dt^I(k)) = MLT$ ;
4: end function

FIG. 7

NDO Message-Processing Algorithm at Router $i$

1: function Process NDO message
2: INPUT: $DART^i$, $CS^i$, $D[n(j), sig(j), dt^I(q)]$ received from $q$;
3: [o] verify $sig(j)$;
4: [o] if verification fails then drop $D[n(j), sig(j), dt^I(q)]$
5: for each $k \in N^i$ do
6:     if $dt^I(q) = sdt_k^i(dt^I(k)) \in DART_k^i$ then
7:         % dart $dt^I(q)$ corresponds to a successor dart established
          % for Interests received from $k$ and can be swapped for a
          % predecessor dart to forward NDO message to $k$;
          $dt^I(i) = pdt_k^i(dt^I(k))$;
          send $D[n(j), sig(j), dt^I(i)]$ to $k$;
          store the content with name $n(j)$ in $CS^i$; return
8:     end if
9: end for
10: drop $D[n(j), sig(j), dt^I(q)]$
11: end function

FIG. 8

Algorithm for Processing DART entry Expiration at Router $i$

1: function Process DART entry Expiration
2: INPUT: $DART^i$, $LT_p^i(d) = 0$;
3: delete $DART_p^i(d)$
4: end function

FIG. 9

NACK Processing Algorithm at Router $i$

1: function Process NACK
2: INPUT: $DART^i, NI[n(j), CODE, dt^I(q)]$ ;
3: for each $k \in N^i$ do
4:     if $dt^I(q) = sdt_k^i(dt^I(k)) \in DART_k^i$ then
5:         % dart $dt^I(q)$ corresponds to a successor dart established
           % for Interests received from $k$ and can be swapped for a
           % predecessor dart to forward NACK to $k$;
           $dt^I(i) = pdt_k^i(dt^I(k))$;
           send $NI[n(j), CODE, dt^I(i)]$ to $k$
           return
6:     end if
7: end for
8: drop $NI[n(j), CODE, dt^I(q)]$
9: end function

FIG. 10

Link-Failure Processing Algorithm at Router $i$

1: function Process Link Failure
2: INPUT: $DART^i$ ;
3: delete $DART_k^i$
4: for each $q \in N^i$ do
5:     for each $DART_q^i(d)$ do
6:         if $s_q^i(d) = k$ then
7:            CODE = failed route; $dt^I(i) = d$ ; send $NI[*, CODE, dt^I(i)]$ to $q$;
               delete $DART_q^i(d)$
8:         end if
9:     end for
10: end for
11: end function

SYSTEM AND METHOD FOR ON-DEMAND CONTENT EXCHANGE WITH ADAPTIVE NAMING IN INFORMATION-CENTRIC NETWORKS

BACKGROUND

Field

The present disclosure relates generally to information-centric networks (ICNs). More specifically, the present disclosure relates to an ICN architecture that implements On-demand Content Exchange with Adaptive Naming (OCEAN).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture, brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In existing interest-based ICN approaches, such as CCN or Named Data Networking (NDN), routers (or nodes in the network) need to maintain a Pending Interest Table (PIT) in order to store the Interest state, including the interfaces from which Interests for specific named data objects (NDOs) are received and the interfaces over which such Interests are forwarded. The PIT allows NDOs that satisfy Interests to follow the reverse path back to the original requester while hiding the identity of the original requester. However, as the number of Interests handled by a router grows, so does the size of the PIT, which can be many orders of magnitude larger than the size of traditional routing tables because routers handle far more Interests than the number of routers in a network.

SUMMARY

One embodiment of the present invention provides a system for content exchange in an information-centric network (ICN). During operation, a first node in the ICN receives an interest for a piece of content from a second node. The interest indicates a name of the piece of content and an incoming identifier assigned to the interest by the second node. The system identifies a matching entry in an identifier table stored on the first node that corresponds to the incoming identifier. The matching entry indicates a next-hop neighbor and an outgoing identifier. The system then updates the interest by replacing the incoming identifier with the outgoing identifier, and forwards the updated interest to the next-hop neighbor.

In a variation on this embodiment, the incoming identifier includes a predecessor token that indicates a previous-hop neighbor to the second node, a forwarding token, and an anchor token that indicates a destination node advertising the piece of content. The forwarding token is unique to a combination of the previous-hop neighbor to the second node, the first node, and the destination node.

In a further variation, the outgoing identifier includes an outgoing predecessor token, an outgoing forwarding token, and an outgoing anchor token. The outgoing predecessor token is the same as the forwarding token, wherein the outgoing forwarding token is unique to a combination of the second node, the next-hop neighbor, and a destination node indicated by the outgoing anchor token.

In a further variation, the incoming identifier is a concatenation of the predecessor token, the forwarding token, and the anchor token.

In a variation on this embodiment, in response to no matching entry corresponding to the incoming identifier being found in the identifier table, the system identifies a next-hop neighbor based on routing information stored on the first node, and creates an entry in the identifier table for the received interest.

In a further variation, creating the entry involves generating an outgoing identifier, and the generated outgoing identifier indicates an outgoing forwarding token that is unique to a combination of the second node, the next-hop neighbor, and a destination node advertising the piece of content.

In a variation on this embodiment, the received interest further indicates a hop count from the second node to a destination node advertising the piece of content. The system determines, based on routing information stored on the first node and the hop count, whether a distance-based forwarding condition is met. In response to the distance-based forwarding condition not being met, the system drops the interest and sends a control message back to the first node.

In a variation on this embodiment, the first node receives a content object in response to the interest. The content object includes a content identifier. The system identifies a second matching entry in the identifier table stored on the first node that corresponds to the content identifier. The second matching entry indicates a previous-hop node to the first node and an identifier associated with the previous-hop node to the first node. The system updates the content object by replacing the content identifier with the identifier associated with the previous-hop node to the first node, and forwards the updated content object to the previous-hop node to the first node.

BRIEF DESCRIPTION OF THE FIGURES

FIG. 2 presents a diagram illustrating an exemplary Forwarding Information Base (FIB), in accordance with an embodiment of the present invention.

FIG. 3 presents a diagram illustrating an exemplary data-answer routing table (DART), in accordance with an embodiment of the present invention.

FIG. 6 presents a diagram illustrating an exemplary Interest-processing algorithm, in accordance with an embodiment of the present invention.

FIG. 7 presents a diagram illustrating an exemplary DART-entry creation algorithm, in accordance with an embodiment of the present invention.

FIG. 8 presents a diagram illustrating an exemplary NDO message-processing algorithm, in accordance with an embodiment of the present invention.

FIG. 9 presents a diagram illustrating an exemplary algorithm for handling an expired DART entry, in accordance with an embodiment of the present invention.

FIG. 10 presents a diagram illustrating an exemplary NACK message-processing algorithm, in accordance with an embodiment of the present invention.

FIG. 11 presents a diagram illustrating an exemplary link-failure processing algorithm, in accordance with an embodiment of the present invention.

In the figures, like reference numerals refer to the same figure elements.

DETAILED DESCRIPTION

Overview

Figure 1:
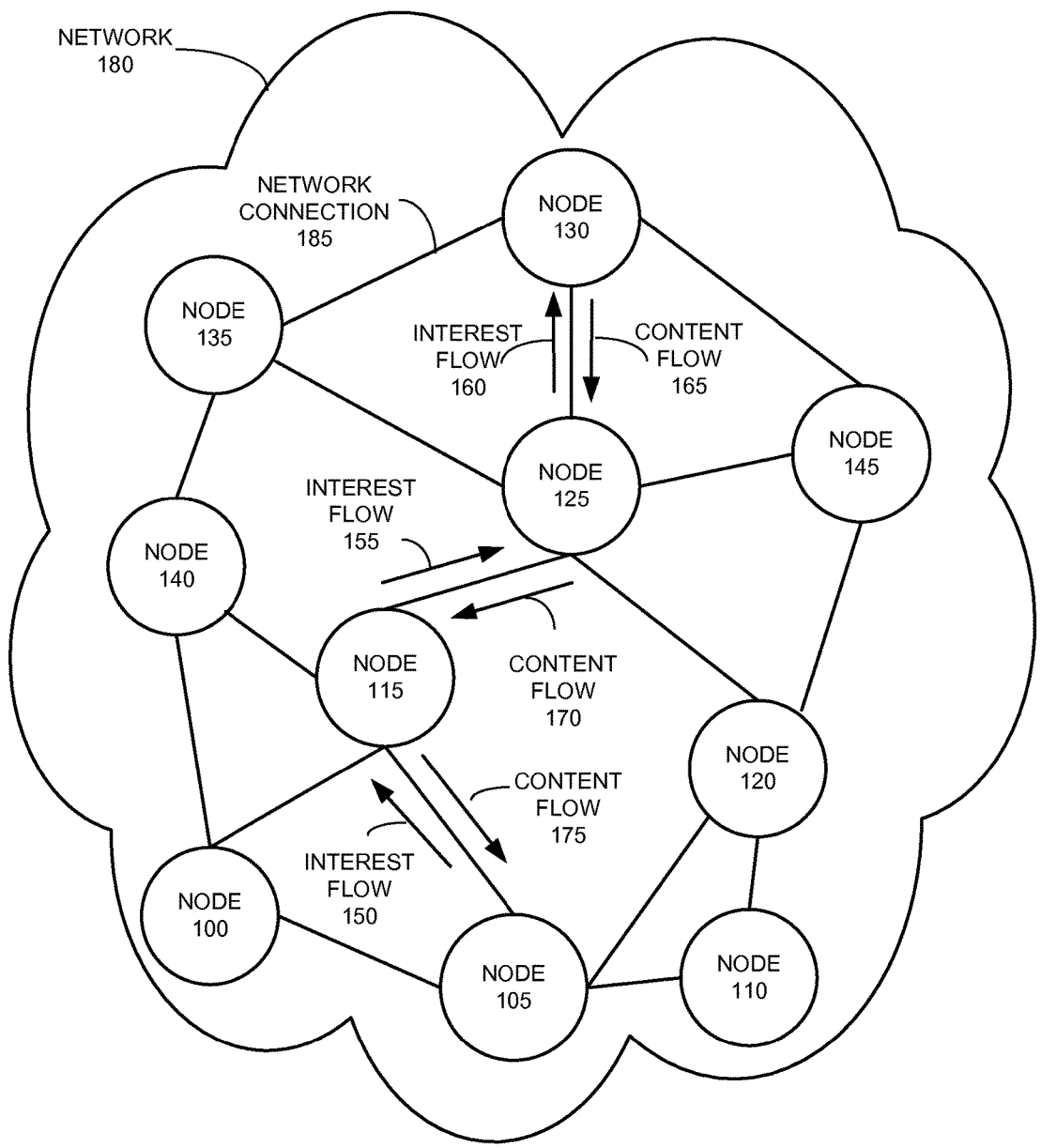
FIG. 1 illustrates an exemplary architecture of a network, in accordance with an embodiment of the present invention.

Embodiments of the present invention provide a CCN system that implements On-demand Content Exchange with Adaptive Naming (OCEAN). More specifically, routers implementing OCEAN no longer need to maintain a Pending Interest Table (PIT). Instead, an OCEAN router maintains a data-answer routing table (DART), which is similar to a label-swapping table used in a label-switching network. Each Interest states the name of the requested content, a hop count, and a destination and return token (dart), which is changed on a hop-by-hop basis and is route-specific. The hop count is used to ensure correct Interest loop detection, and the dart is used by the forwarding routers to leave a trace of the path traversed by the Interest. More specifically, entries in the DART map the darts used for the propagation of Interests to faces of the routers.

CCN Architecture

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also, the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and, optionally, other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. In this disclosure, the term "Content Object" and the term "Named Data Object (NDO)" are exchangeable.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the term "face," referring to an incoming or outgoing interface of an Interest.

"Prefix:" In this disclosure, the term "prefix" can be used to refer to either a name of a specific content object or a name prefix for the content object.

"Anchor:" In this disclosure, the term "anchor" is used to refer to a router that advertises content. More specifically, a router (or a node) that advertises for some or all of the content corresponding to a prefix is referred to as an anchor of the prefix.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message, thus reaching the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

In conventional CCNs, each node (also called as a router) maintains three major data structures, including a Forwarding Information Base (FIB), a Content Store (CS), and a Pending Interest Table (PIT).

FIB is used to forward Interest packets toward potential source(s) of matching Content Objects. Typically, a routing protocol is used to populate the FIB among all nodes in the network. In conventional CCNs, the FIB entries are often indexed by the name prefixes, with each entry including a physical address of at least one face to which the matching Interest should be forwarded. While forwarding Interest messages, longest-prefix-match lookups of names are performed at the FIB to find a matching entry.

Content Store (CS) is similar to the buffer memory used in an IP router. More particularly, CS temporarily buffers Content Objects that pass through this node, allowing efficient data retrieval by different consumers. When a router receives an Interest packet, it first checks whether there is a matching Content Object in its content store prior to issuing an Interest upstream.

Pending Interest Table (PIT) serves as a cache of Interest state. The PIT keeps track of Interests forwarded upstream toward content source(s) so that a returned Content Object can be sent downstream following the reverse Interest path to its requester(s). This preserves upstream and downstream network flow. In CCN, only Interest packets are routed. The returning Content Object follows the trail of the Interest packet back to the content requester. A PIT entry for an Interest specifies the name or name prefix of the Interest and one or multiple incoming faces that requested that Interest.

When an Interest packet arrives on a certain face, a longest-match lookup is done based on the content name, or the HSVLI. The index structure used for the name lookup is ordered in such a way that a CS match will be preferred over a PIT match, which will be preferred over an FIB match. Hence, if there is already a Content Object in CS that matches the Interest, the Content Object will be sent out via the face the Interest arrived on and the Interest will be discarded. Otherwise, the PIT will be checked to see if a match can be found. If so, the Interest's arrival face will be added to the PIT entry's requesting face list and the Interest will be discarded. Otherwise, the FIB will be checked and the Interest is forwarded along the one or more faces listed in the matching FIB entry.

As discussed previously, maintaining a PIT and checking for matches in the PIT can be inefficient because the size of the PIT grows in the order of the number of Interests handled by the routers, and such a number can be orders of magnitude more than the number of routers in a network. Hence, it is desirable to design an Interest-based ICN system that does not rely on PIT to return NDOs to their original requesters.

On-Demand Content Exchange with Adaptive Naming

The design of OCEAN is based on the following observations: (a) the FIBs can maintain more information than just next hops to name prefixes, given that much more routing information is readily available in the control plane;

(b) the routing state in the data plane of an Interest-based ICN does not have to be tied to specific names of NDOs; and (c) a correct forwarding strategy for Interest-based ICNs can be based on an ordering of the routers that forward a given Interest, rather than attempting to identify each Interest uniquely.

During operation, OCEAN uses Interests, certain control messages (such as NACKs), and data objects to implement the exchange of content among nodes. An Interest sent by a node k requesting NDO n(j) is denoted $I[n(j), h^I(k), dt^I(k)]$, which states the requested NDO name (n(j)), a hop count ($h^I(k)$) from node k to name prefix n(j)* that is the best match for n(j), and the dart ($dt^I(k)$) that the router answering the Interest should use. A content object sent in response to Interest $I[n(j), h^I(k), dt^I(k)]$ is denoted $D[n(j), sig(j), dt^I(k)]$, which states the name (n(j)) of the Interest, a signature payload (sig(j)) used to validate the content object, the dart ($dt^I(k)$) in the Interest that prompts the transmission of the NDO, and the NDO itself. On the other hand, the control message (NACK) sent by router i in response to Interest $I[n(j), h^I(k), dt^I(k)]$ is denoted $NI[n(j), CODE, dt^I(k)]$, where CODE states the reason for sending the NACK. Possible reasons for sending a NACK include: (a) an Interest loop is detected, (b) no route is found toward the requested content, (c) no content is found, and (d) the DART entry expired.

To implement the forwarding of Interests, NDOs and NACKs, an OCEAN router maintains an FIB, an optional content store, and a data-answer routing table (DART).

FIG. 2 presents a diagram illustrating an exemplary Forwarding Information Base (FIB), in accordance with an embodiment of the present invention. In FIG. 2, FIB 200 includes a number of entries indexed using content name prefixes. Each entry states the next hop to the content identified by the name prefix and a hop count to the node advertising the name prefix. For notation purposes, at router i, the FIB is denoted as $FIB^i$, and each FIB entry for a name prefix n(j)* is denoted as $FIB_{n(j)}^i$, such as FIB entry 202. Note that each FIB entry may include a list of one or more tuples, one for each next hop. The set of next hops to n(j)* listed in the $FIB_{n(j)}^i$* is denoted as $S_{n(j)}^{*i}$. For each interface q, ($q \in S_{n(j)}^{*i}$), the corresponding tuple states the hop count to a name prefix n(j)* through neighbor q (denoted as h(i,n(j)*, q)) and the anchor reported by q for n(j)* (denoted as a(i,n(j)*, q)). FIB 200 also stores a minimum hop count from the router to each known name prefix through any neighbor listed in FIB 200. More specifically, the minimum hop count from router i to name prefix n(j)* is denoted h(i,n(j)*).

FIG. 3 presents a diagram illustrating an exemplary data-answer routing table (DART), in accordance with an embodiment of the present invention. The DART stores the mapping of destination and return tokens (darts). Note that such tokens (not to be confused with the routing table DART) are used to propagate Interests. More specifically, a router k requesting NDO n(j) sends an Interest ($I[n(j), h^I(k), dt^I(k)]$) that includes the NDO name n(j), a hop count $h^I(k)$, and a dart $dt^I(k)$. Hop count $h^I(k)$ states the hop count from router k to the name prefix n(j)* that best matches NDO name n(j) when router k forwards the Interest. The dart $dt^I(k)$ states the identifier of the previous hop, the current hop, and a router that advertises the prefix matching the name of the NDO being requested. More specifically, $dt^I(k)=p[dt^I(k)]$ & $f[dt^I(k)]$ & $a[dt^I(k)]$, with & denoting the concatenation of strings, p denoting the previous hop, f denoting the current hop, and a denoting the anchor for the name prefix. The first element in the dart (such as $dt^I(k)$) is called a predecessor token of the dart, the second element is called the forwarding token of the dart, and the third element is called the anchor token of the dart. The forwarding token, $f[dt^I(k)]$, is a locally unique identifier (such as a locally generated nonce) that router i assigns to any Interest it forwards from neighbor k to a particular neighbor and is intended for any name prefix hosted by a certain anchor.

In FIG. 3, DART 300 includes a number of entries that are organized according to the interfaces of router i. At router i, the DART is denoted as $DART^i$, and $DART_p^i$ denotes a sub-table in $DART^i$, such as a sub-table 302, which includes entries corresponding to interface p. Entries in each sub-table are indexed by the darts stated in the Interests received from that particular neighbor, such as p. Note that a neighbor that sends an Interest to router i regarding an NDO n(j) is called a predecessor of i for NDO n(j), and the set of predecessors of router i for n(j) is denoted $P_{n(j)}^i$. On the other hand, a router to whom router i forwards an Interest regarding NDO n(j) is called a successor of i for NDO n(j), and the set of successors of router i for n(j) is denoted $S_{n(j)}^i$.

The DART entry corresponding to one or more Interests received from neighbor p in which p assigns dart $dt^I(p)$ is denoted $DART_p^i(dt^I(p))$. Each entry in sub-table $DART_p^i$, such as entry 304, specifies the predecessor dart, the name of the successor selected by i to forward the Interest, the successor dart used by i when it forwards the Interest, the hop count used to forward the Interest using the same successor dart; and a lifetime for the entry. The notation for each component of the DART entry is illustrated in FIG. 3. For example, DART entry $DART_p^i(dt^I(p))$, or entry 304 in FIG. 3, includes the identifier of node p, predecessor dart $pdt_p^i(dt^I(p))$, an identifier of the successor $s_p^i(dt^I(p))$, a successor dart $sdt_p^i(dt^I(p))$, a hop count $h_p^i(dt^I(p))$ assumed by router i when it forwards Interest $I[n(j), h^I(p), dt^I(p)]$, and a lifetime $LT_p^i(dt^I(p))$.

The lifetime of a DART entry is decremented while the router stores it and the entry is deleted when the lifetime reaches zero. In contrast to the lifetime of an entry in a PIT, the lifetime of a DART entry is not a critical design parameter. An entry in a DART can remain in storage for a long period (e.g., many seconds) in the absence of topology changes. Furthermore, the removal of a DART entry causes only a minor slowdown of some Interests and the most likely case in a stable network is for the replacement of the DART entry to state the same information as the entry that was erased.

By including the hop count parameter in the Interest, OCEAN ensures correct detection of any Interest loops. More specifically, OCEAN implements a distance-based forwarding strategy to ensure that a router accepts an Interest from a neighbor only if the router determines that it is closer to the prefix through at least one interface than the neighbor when the neighbor forwards the Interest. Detailed description of the distance-based forwarding strategy that can be used to prevent Interest loops can be found in the co-pending patent application Ser. No. 14/572,608, entitled "SYSTEM AND METHOD FOR DISTANCE-BASED INTEREST FORWARDING," by inventor Jose J. Garcia-Luna-Aceves, filed 16 Dec. 2014, the disclosure of which is incorporated herein by reference in its entirety.

When routers implementing OCEAN receive Interests, they first determine whether to accept the Interests using a hop-count Interest forwarding rule (HIFR), which states that a router i can accept an Interest $I[n(j), h^I(k), dt^I(k)]$ from a neighbor k if the following condition is satisfied:

$$\exists v (v \in S_{n(j)}^{*i} \wedge h^I(k) > h(i,n(j)^*,v)).$$

Note that, compared with the distance-based forwarding strategy that is used in a CCN that implements PIT and hence allows Interest aggregation, in embodiments of the present invention, the Interest forwarding rule no longer considers the Interest aggregation because OCEAN routers do not maintain a PIT.

Once router i accepts an Interest to be forwarded, it must either create a new entry in $DART^i$ or use an existing entry in $DART^i$, so that NDOs or NACKs received in response to Interests forwarded by router i can be forwarded to the proper neighbors of i along the reverse path traversed by the Interests. To hide the identity of the original requesters, routers need to do this without using any identifiers for the origins of Interests. In addition, the DART entries should denote each Interest uniquely; otherwise, the size of the DART will be too large.

In some embodiments, router i uses the following rule to label Interests with darts and swap darts in Interests and NDOs/NACKs in such a way that NDOs/NACKs are associated correctly with forwarded Interests. The Interest-Labeling Rule (ILR) states that if a router i accepts Interest $I[n(j), h^t(k), dt^t(k)]$ from neighbor k with $dt^t(k)=p[dt^t(k)]$ & $f[dt^t(k)]$ & $a[dt^t(k)]$ and forwards the Interest to neighbor q, then it sets $dt^t(i)=p[dt^t(i)]$ & $f[dt^t(i)]$ & $a[i, n(j)*, q]$ in the forwarded Interest, where $p[dt^t(i)]=f[dt^t(k)]$, and $f[dt^t(k)]$ is a locally unique identifier that router i assigns to any Interest it forwards from neighbor k to neighbor q regarding the same anchor $a[i,n(j)*, q]$. In other words, when forwarding an Interest, the router swaps the dart included in the received Interest ($dt^t(k)$) with a new dart ($dt^t(i)$). Note that the operator "&" denotes the concatenation of strings with each string being identifiable from the aggregate.

In addition to setting the new dart in the forwarded Interest, router i establishes an entry in $DART^i$ with the mapping $[k;dt^t(k)] \leftrightarrow [q;dt^t(i)]$. More specifically, such a mapping is reflected by the DART entry $DART_k^i(dt^t(k))$, which lists the incoming interface (k), the predecessor dart ($pdt_k^i(dt^t(k))$), the successor/outgoing interface ($s_k^i(dt^t(k))$), and the successor dart ($sdt_k^i(dt^t(k))$).

When an NDO or a NACK is received from neighbor q with the tokens corresponding to dart $dt^t(i)$ used in Interests forwarded from i to q, router i looks up $DART^i$ to obtain the exact match for $[q; dt^t(i)]$, and identifies neighbor k based on the matching entry. Router i then swaps $dt^t(i)$ using the dart $dt^t(k)$, which is listed in the matching dart entry, and forwards the NDO or NACK to k.

Figure 4:
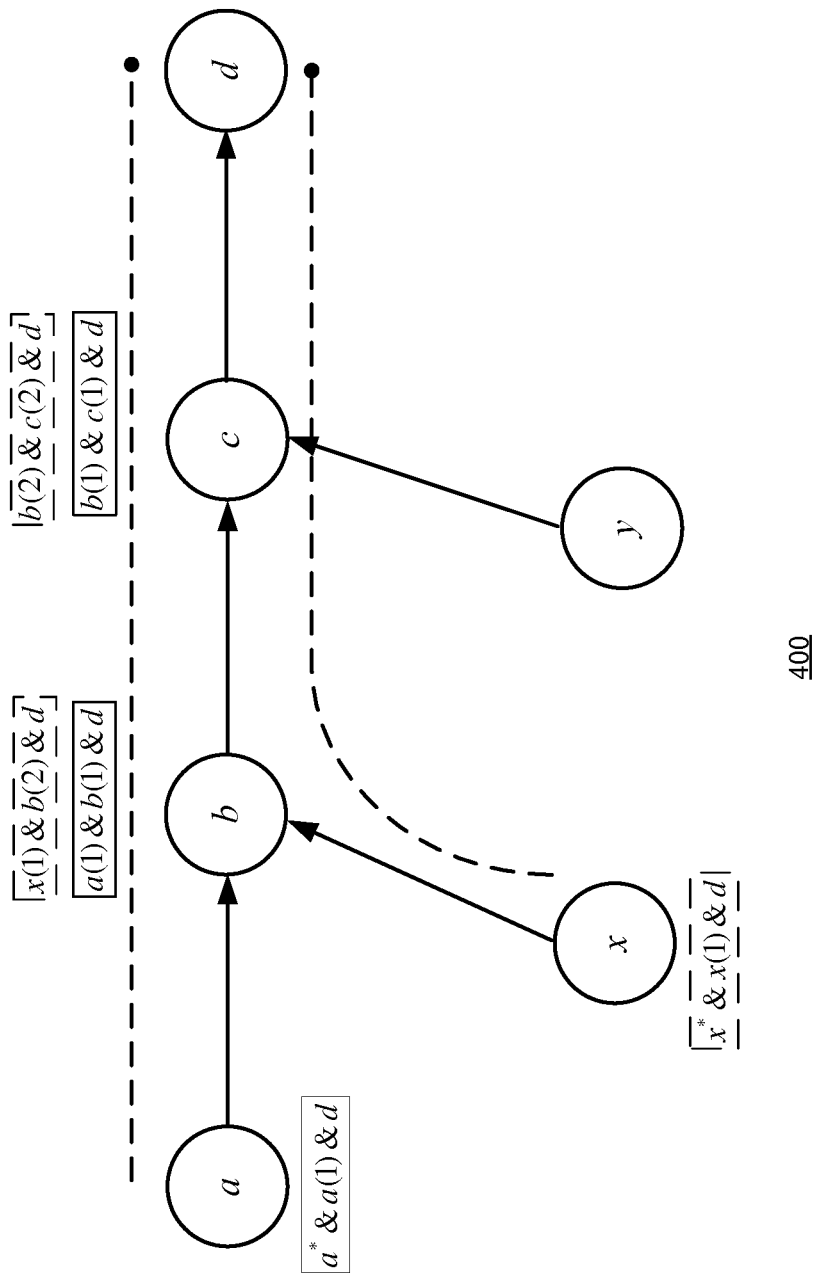
FIG. 4 illustrates how routers label Interests, in accordance with an embodiment of the present invention.

FIG. 4 illustrates how routers label Interests, in accordance with an embodiment of the present invention. In FIG. 4, a network 400 includes a number of routers, such as routers a, b, c, d, x, and y. In this particular example, routers a and x are the origins of Interests. More specifically, router a labels its Interest with dart a* & a(1) & d, where a* and a(1) are identifiers that router a uses for Interests it originates that are sent to neighbor b and are intended for any name prefix hosted by anchor d. More specifically, a* is the predecessor token and a(1) is the forwarding token. Both tokens are assigned by router i and are locally unique. Similarly, router x labels its Interest with dart x* & x(1) & d.

When the Interest from router a is forwarded to router b, router b swaps the label as a(1) & b(1) & d. Here, the predecessor token is now the forwarding token included in the Interest, and the forwarding token is now b(1), which is an identifier that router b uses to label all Interests that are received from neighbor a with a forwarding token a(1), that are sent to neighbor c, and that are intended for any name prefix hosted by anchor d. Consequently, this forwarding token is unique to a combination of the incoming face, the outgoing face, and the destination of the Interest. In other words, this forwarding token is route-unique. Similarly, router b labels the Interest it received from neighbor x (which has a dart x* & x(1) & d) with a new dart x(1) & b(2) & d. Note that the forwarding labels used by router b for these two Interests are different. Here b(2) is an identifier that router b uses to label all Interests that are received from neighbor x with a forwarding token x(1), that are sent to neighbor c, and that are intended for any name prefix hosted by anchor d. As one can see, even the next hop (neighbor c) and the destination of the Interests are the same (anchor d); intermediate routers assign different forwarding tokens if the Interests are received from different neighbors. In FIG. 4, the different patterned frames around the labels refer to the different Interests, and the dashed lines indicate Interest routes.

The label swapping operations for Interests performed at router c similar to the ones performed at router x. More specifically, when router c forwards the Interests, the Interest originated at router a is assigned a dart b(1) & c(1) & d, and the Interest originated at router x is assigned a dart b(2) & c(2) & d. When the labels are swapped, routers maintain the mapping of the darts in their DARTs. For example, the DART on router b maintains a mapping [a; a* &a(1) & d] ↔ [c; a(1) & b(1) & d] and [x; x * &x(1) & d]⇆[c; x(1) & b(2) & d], and the DART on router c maintains a mapping [b; a(1) & b(1) & d]⇆[d; b(1) & c(1) & d] and [b; x(1) &b(2) & d]⇆[d; b(2) & c(2) & d].

When anchor d receives the Interest with dart b(1) & c(1) & d from router c, it sends back to c an NDO message with the same dart. In turn, when router c processes such an NDO message, it checks entries in its DART ($DART^c$) to find the mapping [b; a(1) & b(1) & d]⇆[d; b(1) & c(1) & d]. Subsequently, router c swaps the dart in the NDO message based on the mapping, i.e., changes the dart from b(1) & c(1) & d to a(1) & b(1) & d; and forwards the NDO message to router b (which is identified based on the mapping as well). Similarly, when router b receives such an NDO message from c, it checks its own DART and swaps the dart in the NDO message from a(1) & b(1) & d to a* & a(1) & d, and then forwards the message to router a. This way, each router forwarding the NDO message sent in response to the Interest originated by a can make the correct forwarding decision because of the swapping of darts carried out at each router.

Figure 5:
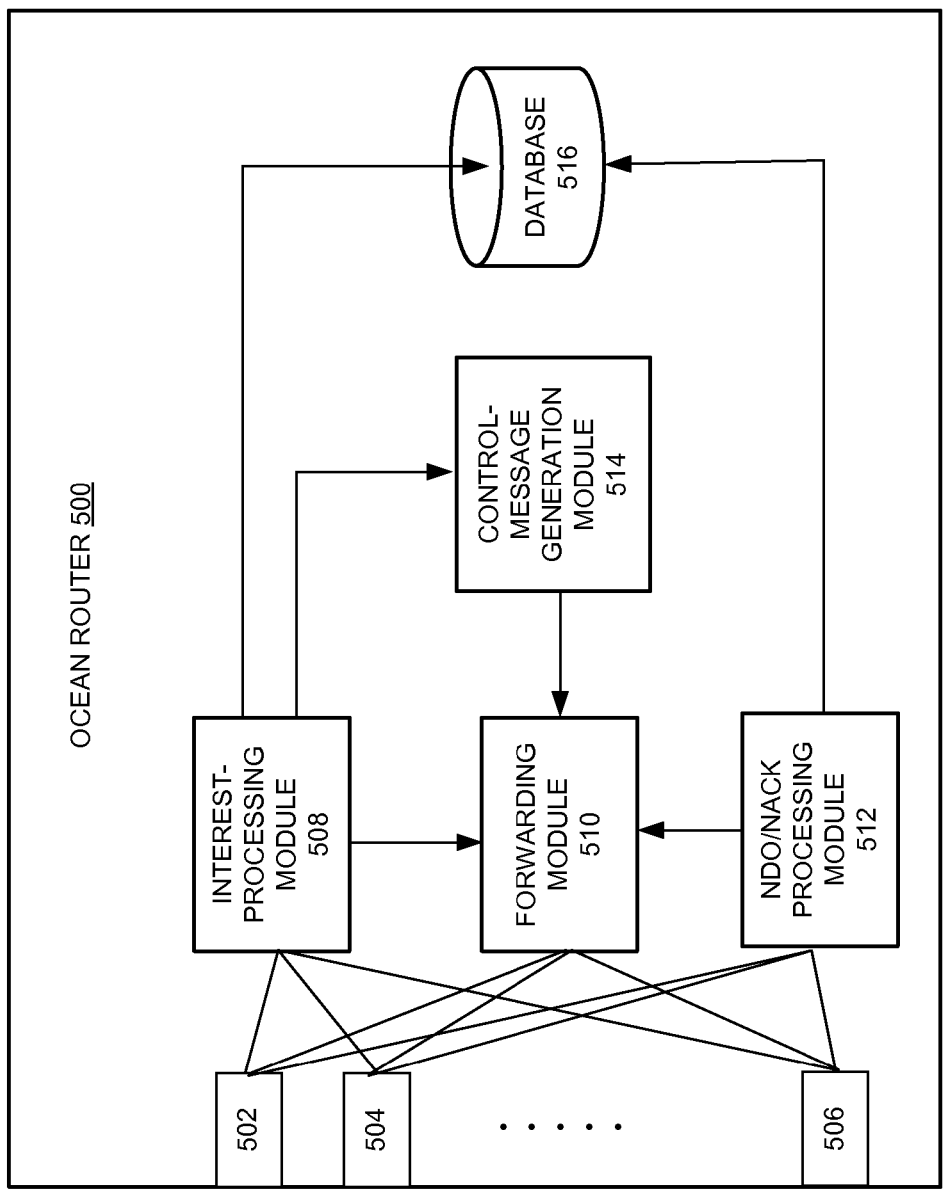
FIG. 5 presents a diagram presenting an exemplary architecture of an OCEAN router, in accordance with an embodiment of the present invention.

FIG. 5 presents a diagram presenting an exemplary architecture of an OCEAN router, in accordance with an embodiment of the present invention. In FIG. 5, OCEAN router 500 includes a number of faces, such as faces 502, 504, and 506; an Interest-processing module 508; a forwarding module 510; an NDO/NACK processing module 512; a control-message generation module 514, and a database 516.

Faces 502-506 can include not only physical interfaces but also application processes capable of sending and receiving packets, including Interests and NDOs. Interest-processing module 508 is responsible for processing the Interests received on the various faces. In some embodiments, Interest-processing module 508 determines whether to accept an incoming Interest based on the aforementioned hop-count Interest forwarding rule (HIFR). If the Interest is accepted, Interest-processing module 508 checks the DART maintained in database 516 to find a dart mapping, and swaps the dart included in the Interest based on the mapping. Forwarding module 510 is responsible for forwarding packets, such as Interests or Content Objects, to the faces. In some embodiments, forwarding module 510 forwards the Interests/NDOs based on the dart mapping. Control-message generation module 514 generates control messages, which can include different NACK messages, when Interest-processing module 508 rejects or drops an Interest. In some embodiments, control-message generation module 514 generates NACK messages under various conditions, including but not limited to when: an Interest loop is detected, no route is found toward the requested content, no content is found, and the corresponding DART entry expires. A NACK message in response to an Interest for name n(j) is denoted NI[n(j), CODE, $dt^I(k)$], where CODE states the condition under which the NACK is sent. NDO/NACK processing module 512 is responsible for processing NDO/NACK messages received in response to Interests. In some embodiments, NDO/NACK processing module 512 checks the DART maintained in database 516 to find a dart mapping, and swaps the dart included in the NDO/NACK message based on the mapping. Database 516 stores the data structures needed for OCEAN operation: the Forwarding Information Base and the data-answer routing table. Database 516 optionally stores a Content Store.

FIG. 6 presents a diagram illustrating an exemplary Interest-processing algorithm, in accordance with an embodiment of the present invention. While implementing the exemplary algorithm shown in FIG. 6, it is assumed that content requests from local content consumers are sent to the router in the form of Interests stating infinite hop counts to content and empty darts. In addition, a router knows which interfaces are remote (i.e., neighbor routers) and which are local.

From FIG. 6, one can see that, when Interest-processing module 508 of a router i receives an Interest I[n(j), $h^I(k)$, $dt^I(k)$] from a neighbor k, it first checks the Content Store $CS^i$ for a match. If a match is found, forwarding module 510 returns the matching NDO to neighbor k. Note that D[n(j), sig(j), $dt^I(k)$] denotes a content-object message sent in response to Interest I[n(j), $h^I(k)$, $dt^I(k)$].

If no match is found in the Content Store, Interest-processing module 508 checks the DART for a matching entry. If a DART entry exists with a predecessor dart equal to the dart stated in the Interest received from router k, the router swaps the dart in the Interest and forwards the Interest to the successor indicated by the matching DART entry. Note that $pdt_k^i(dt^I(k)) \in DART_k^i$ denotes the event that an entry exists in $DART_k^i$ with a predecessor dart equal to the dart $dt^I(k)$ that router k sent in a prior Interest to router i.

If no match is found in the DART, router i checks its FIB for a match. If no match is found in the FIB, it is determined that no route exists to the requested content. In response, control-message generation module 514 generates a NACK message NI[n(j), no route, $dt^I(k)$], stating that the NACK is issued because no route is found. Subsequently, forwarding module 510 forwards the NACK to neighbor k, and Interest-processing module 508 drops the received Interest.

If a match is found in the FIB, Interest-processing module 508 determines whether the Interest can be forwarded based on the HIFR, i.e., whether router i is closer to name prefix n(j)* through at least one neighbor than router k was when it sent its Interest. If so, it is determined that the Interest can be forwarded, router i creates a DART entry, and forwarding module 510 forwards the Interest based on the appropriate forwarding algorithm. More specifically, when processing the Interest, router i selects the first neighbor v found in the ranked list of interfaces stored in $FIB^i$ for prefix n(j)* such that v offers a path that has a hop count toward the requested content that is strictly smaller than the hop count stated in the Interest being forwarded. Note that, although it is possible to design a more sophisticated forwarding strategy to attain load balancing among multiple available routes toward content, such an approach may require the adoption of a loop-free routing protocol in the control plane. In this context, the control plane establishes valid multi-paths to content prefixes using long-term performance measures, and the data plane exploits those paths using short-term performance measurements (such as using a distance-based forwarding strategy), without risking the long delays associated with backtracking due to looping.

If the HIFR is violated, it is determined that the Interest may be traversing a loop. In response, control-message generation module 514 generates a NACK message NI[n(j), loop, $dt^I(k)$], stating that the NACK is issued because a loop is found. Subsequently, forwarding module 510 forwards the NACK to neighbor k, and Interest-processing module 508 drops the received Interest.

When implementing the exemplary algorithm shown in FIG. 6, it is assumed that content requests from local content consumers are sent to the router in the form of Interests stating infinite hop counts to content and empty darts. In addition, a router knows which interfaces are remote (i.e., neighbor routers) and which are local.

FIG. 7 presents a diagram illustrating an exemplary DART-entry creation algorithm, in accordance with an embodiment of the present invention. During operation, router i uses the dart included in the Interest for which the DART entry is created as the key (the predecessor dart). The created DART entry list v as the successor of the dart, the successor dart created by router i according to the ILR, the hop count ($h^I(i)$) used in the Interests, and the lifetime of the entry. More specifically, the successor dart uses the forwarding token of the received Interest as the predecessor token, a unique local identifier (denoted $lid(DART_k^i)$) as the forwarding token, and the name of the anchor selected for prefix n(j)* as the anchor token. The successor dart is the concatenation of the three tokens. The lifetime of a DART entry is assumed to be a predefined constant MLT.

FIG. 8 presents a diagram illustrating an exemplary NDO message-processing algorithm, in accordance with an embodiment of the present invention. According to the algorithm shown in FIG. 8, a router accepts an NDO received from a neighbor if it has a DART entry with the successor dart matching the dart stated in the NDO message. Note that $sdt_k^i(dt^I(k)) \in DART_k^i$ denotes the event that an entry exists in $DART_k^i$ that has a successor dart $sdt_k^i(dt^I(k))$ matching the predecessor dart $dt^I(k)$ used in Interests sent to router i by its neighbor k. The router may optionally verify the signature payload and drops the NDO if such verification fails. If no matching DART entry is found, the router drops the Interest. Moreover, the router may optionally store a data object it receives according to certain ICN-caching strategies, which can be path-based or edge-based. Although the algorithm shown in FIG. 8 assumes that caching of content by routers occurs along the paths traversed by Interest, it does not exclude the case that OCEAN can operate well when caching is done only at the edges of the network. Note that when forwarding the NDO, the router swaps the dart in the received NDO with the processor dart in the matching DART entry, and forwards the modified NDO to the neighbor that sends the corresponding Interest, as specified by the corresponding DART entry.

FIG. 9 presents a diagram illustrating an exemplary algorithm for handling an expired DART entry, in accordance with an embodiment of the present invention. When a DART entry for dart d established with neighbor p expires, router i simply deletes the DART entry.

FIG. 10 presents a diagram illustrating an exemplary NACK message-processing algorithm, in accordance with an embodiment of the present invention. According to the algorithm shown in FIG. 10, router i forwards the NACK it receives for n(j) only if it has a DART entry with a successor dart matching the dart stated in the NACK. Note that the processing of the NACK is similar to that of the NDO, which also involves swapping the dart carried by the NACK and forwarding the NACK to the neighbor that sends the corresponding Interest.

FIG. 11 presents a diagram illustrating an exemplary link-failure processing algorithm, in accordance with an embodiment of the present invention. During operation, when router i detects that connectivity to neighbor k is lost, it deletes all DART entries for Interests received from k, and all DART entries for Interests forwarded to k. In addition, router i sends a NACK to neighbor q for each DART entry listing k as the successor of Interests from q. The algorithm assumes that the control plane updates $FIB^i$ to reflect any changes in hop counts to name prefixes resulting from the loss of connectivity to one or more neighbors.

Operation Examples

Figure 12A:
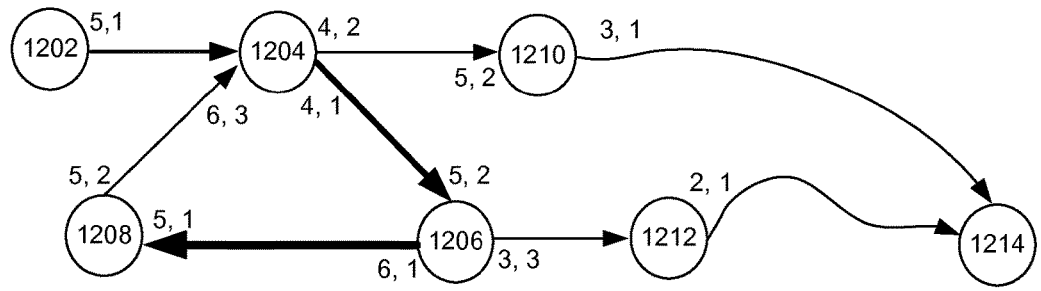
FIGS. 12A-12B present a diagram illustrating an operation example of OCEAN, in accordance with an embodiment of the present invention.
Figure 12B:
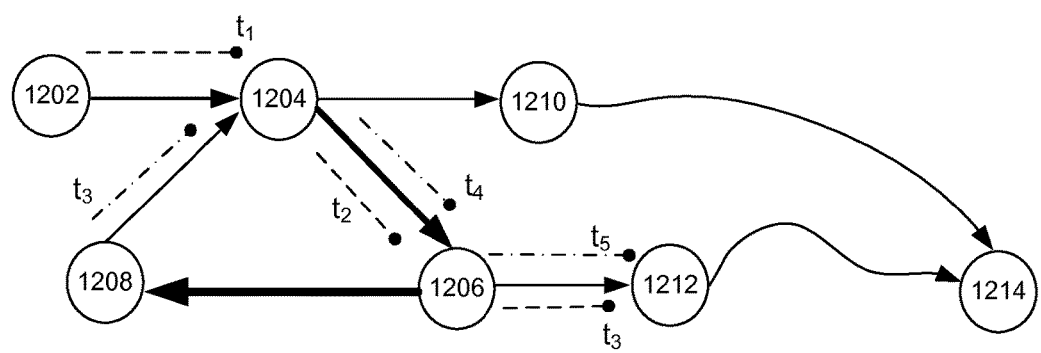

FIGS. 12A-12B present a diagram illustrating an operation example of OCEAN, in accordance with an embodiment of the present invention. More specifically, FIG. 12A illustrates the routing information as determined by the control plane, and FIG. 12B illustrates how Interests traverse the links. In the figures, network 1200 includes a number of nodes, such as nodes 1202-1214, with arrowed lines indicating the next hops to content (with a name n(j)) advertised by router 1214 according to the FIB entries stored in the routers. The line thickness of the arrowed lines indicates the perceived performance of an interface. A thicker line indicates that the interface is better than interfaces shown with thinner lines. For example, link (node 1206, node 1208) performs better than link (node 1204, node 1206).

The example shown in FIGS. 12A-12B is used to demonstrate the operation in a case where the control plane establishes multiple paths to each name prefix but does not guarantee loop-free routing tables. In this example, it is assumed that: (a) routers execute a routing protocol that does not enforce loop-free FIBs; and (b) the ranking of neighbors is determined independently at each router using some data-plane strategy based on the perceived performance of each path and interface. Note that the distance value of a path need not be directly proportional to the hop count value of the path shown in the figure.

As shown in FIG. 12A, multiple paths exist between nodes 1202 and 1214, and the routing table may include a loop: node 1204-node 1206-node 1208-node 1204. In addition, in FIG. 12A, at each link outgoing from a router to its neighbors a pair of numbers is listed, indicating a hop count (the first number) through the neighbor to n(j) (node 1214) and the rank of the neighbor in the FIB (the second number). Note that for the same link there might be two pairs, and each pair is stored at the FIB in the router that is closer to the pair. For example, on the link from router 1204 to router 1206, two number pairs, pair (4, 1) and pair (5, 2) are shown next to the link. Number pair (4, 1) is adjacent to router 1204 and is stored in the FIB of router 1204, and number pair (5, 2) is adjacent to router 1206 and is stored in the FIB of router 1206. More specifically, the number pair (4, 1) adjacent to router 1204 indicates that the hop count to n(j) via its neighbor 1206 is 4, and neighbor 1206 ranks number 1 in the FIB of router 1204. On the other hand, the number pair (5, 2) adjacent to router 1206 indicates that the hop count from its neighbor 1204 to n(j) is 5, and neighbor 1204 ranks number 2 in the FIB of router 1206.

One can use a tuple (v, h, r) to indicate a neighbor, its hop count, and its ranking. Note that such a tuple can be entries listed in the FIB under name prefix n(j)*. For example, $FIB^{node\ 1204}$ can list tuples (Node 1206,4,1), (Node 1210,4, 2), and (Node 1208,6,3). Similarly, $FIB^{node\ 1202}$ can list a tuple (Node 1204,5,1); $FIB^{node\ 1206}$ can list tuples (Node 1208,6,1), (Node 1204,5,2), and (Node 1212,3,3); and $FIB^{node\ 1208}$ can list tuples (Node 1206,5,1) and (Node 1204, 5,2). Note that partial FIB entries for nodes 1210 and 1212 are also shown in FIG. 12A.

FIG. 12B illustrates how OCEAN routers forward Interests. In the example shown in FIG. 12B, router 1204 received an Interest I[n(j), $h^I$(Node 1202)=5, $dt^I$(Node 1202)] for name n(j) from router 1202 at time $t_1$. Given that $h^I$(Node 1202)>h(Node 1204, n(j)*, Node 1206)=4, router 1204 accepts the Interest because it has at least one neighbor (router 1206) that satisfies the HIFR. Router 1204 then forwards the Interest to router 1206 because router 1206 is the highest-ranked neighbor that satisfies the HIFR. Note that, before forwarding, router 1204 swaps the dart in the Interest, and forwards Interest I[n(j), $h^I$(Node 1204)=4, $dt^I$(Node 1204)] to router 1206.

Router 1204 receives I[n(j), $h^I$(Node 1204)=4, $dt^I$ (Node 1204)] at time $t_2$, and accepts it because 4=$h^I$(Node 1204)>h(Node 1206, n(j)*, Node 1212)=3. Router 1204 then uses router 1212 as the next hop for the Interest because router 1212 is the highest-ranked neighbor that satisfies the HIFR. The route traversed by the Interest is indicated by a dashed line following time sequence $t_1 \rightarrow t_2 \rightarrow t_3$. Note that each router along the way swaps the dart included in the Interest to ensure the returning NDO can follow the reverse path of the Interest.

Similarly, the Interest generated by router 1208 is forwarded to router 1212 toward n(j) (the route is indicated by a different dashed line following time sequence $t_3 \rightarrow t_4 \rightarrow t_5$) without traversing a loop because each relaying router must satisfy the HIFR.

As one can see from the example shown in FIGS. 12A-12B, the Interests are forwarded along loop-free paths if the routers implement OCEAN and the FIBs maintained by the routers have consistent information, even if some of the multi-paths implied in the FIBs involve loops. It can be proven that, in general, Interest loops cannot occur and be undetected in an ICN in which OCEAN is implemented. It can also be proven that OCEAN is safe in an ICN that is free of faults and transmission errors.

Figure 13A:
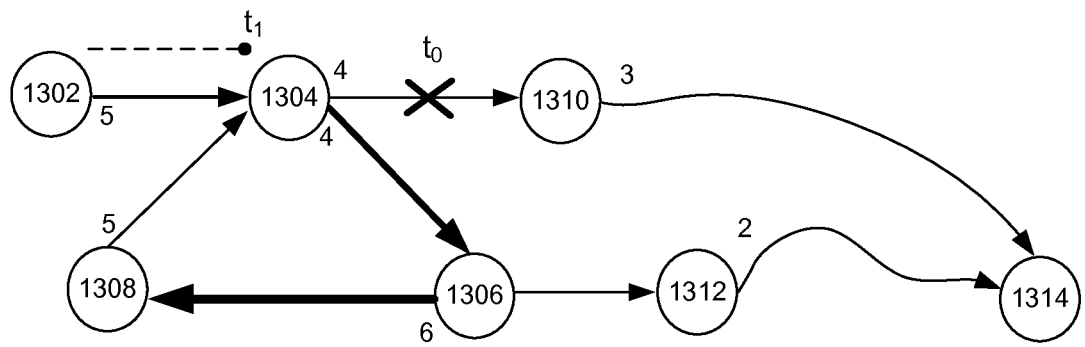
FIGS. 13A-13C present a diagram illustrating an operation example of OCEAN, in accordance with an embodiment of the present invention.
Figure 13B:
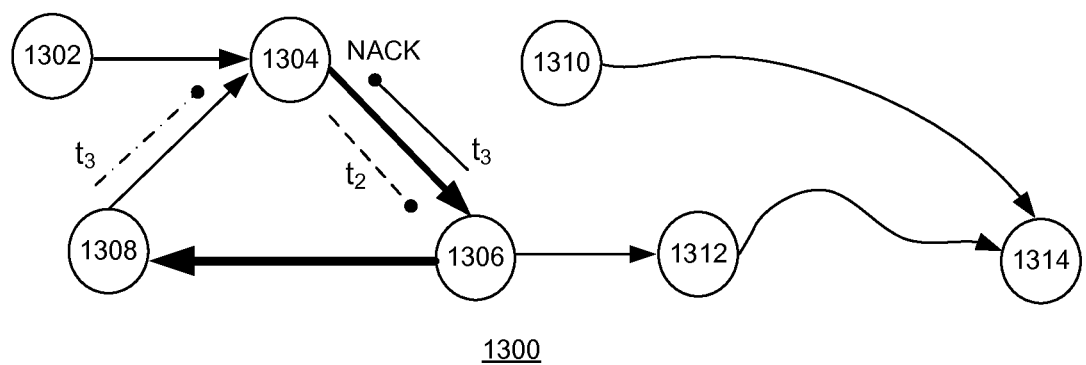
Figure 13C:
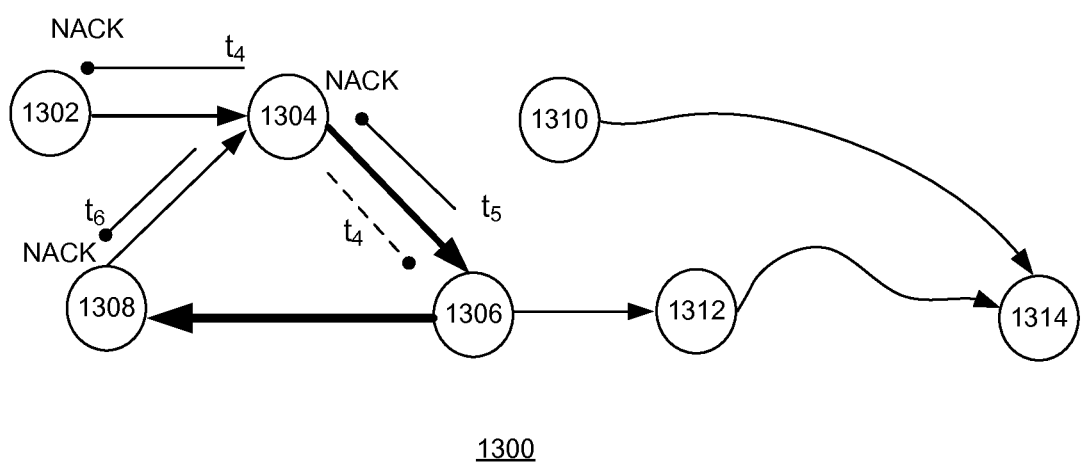

FIGS. 13A-13C present a diagram illustrating an operation example of OCEAN, in accordance with an embodiment of the present invention. More specifically, the example shown in FIGS. 13A-13C is used to demonstrate the operation in a case where the control plane only uses single-path routing. In FIG. 13A, each router has a single next hop and one hop count for each prefix listed in its FIB. For example, for a name prefix n(j)* advertised by router 1314, router 1304 lists a hop count of 4 via neighbor router 1306, and router 1306 lists a hop count of 6 via neighbor router 1308. Note that the distance from a router to name prefix n(j)* may not be directly proportional to hop counts of the paths. For example, link (node 1306, node 1312) may have limited bandwidth or long delays, and hence node 1306 prefers the path through node 1308 to reach n(j)* at node 1314.

When the link between router 1304 and router 1310 fails, router 1306 updates its FIB to reflect the link failure at time $t_0$, as shown in FIG. 13A. Note that such a link failure results in routers in network 1300 having inconsistent FIB states for n(j) while Interests are being forwarded. At time $t_1$, router 1302 sends an Interest I[n(j), $h^r$(Node 1302)=5, $dt^r$(Node 1302)] for name n(j) to router 1304. FIG. 13B shows that router 1304 forwards the Interest to router 1306 at time $t_2$. Note that the dart included in the Interest has been swapped based on the aforementioned Interest labeling rule. FIG. 13B also shows that router 1306 responds to the Interest with a NACK at time $t_3$, because 4=$h^r$(Node 1304) ≯ h(Node 1306, n(j)*, Node 1308)=6, which violates the HIFR. In fact, the NACK will indicate the reason for the NACK as loop detected. The NACK will be eventually forwarded all the way to the originator of the Interest, router 1302, at time $t_4$, as shown in FIG. 13C.

FIG. 13B also shows that, at time $t_3$, router 1308 sends an Interest I[n(j), $h^r$(Node 1308)=5, $dt^r$(Node 1308)] for name n(j) to router 1304. Such an Interest also prompts a NACK from router 1306 at time $t_5$ due to HIFR violation, as shown in FIG. 13C. FIG. 13C also illustrates that router 1304 forwards the NACK from router 1306 to router 1308 at time $t_6$. Note that such forwarding is based on the dart included in the NACK and the DART entries maintained on router 1306.

Within a finite time, $FIB^{Node\ 1304}$, $FIB^{Node\ 1306}$, and $FIB^{Node\ 1308}$ are updated to reflect the new topology state. More specifically, the FIB for node 1306 may no longer list node 1308 as its next hop, and Interests from node 1302 regarding n(j)* can be forwarded along the chain of nodes 1304, 1306, and 1312 toward n(j)*, i.e., node 1314. Similarly, within a finite time, Interests from node 1308 regarding n(j)* can be forwarded to nodes 1304 and 1306 toward n(j)*.

As discussed previously, the On-demand Content Exchange with Adaptive Naming (OCEAN) system implements a forwarding strategy for Interest-based ICN that does not require pending Interest tables (PITs) to operate. OCEAN operates by requiring that FIBs store the next-hop neighbors and the hop count through such neighbors to named content, and by having each Interest state the name of the content requested, the hop count from the relaying router to the content, and a destination and return token (dart), which includes three concatenated identifiers that are route-unique. Interests are not aggregated, and Interest loop detection is based on distances to content prefixes.

Instead of using a PIT, an OCEAN router uses a data-answer routing table (DART) to maintain Interest state. Each DART entry at a router establishes the mapping between incoming and outgoing interfaces over which data objects or negative acknowledgments must be sent back to a consumer that issued an Interest. The state of a DART is a function of routes traversed toward routers that advertise content prefixes, rather than the routes traversed by individual Interests requesting specific named data objects (NDO), as in conventional CCN or NDN networks. In other words, unlike the PIT that has Interest-specific entries and grows in size with the number of Interests, the DART entries are route-specific; hence, the size of the DART is much smaller than that of the PIT. In addition, OCEAN implements a forwarding rule that prevents Interest loops from being undetected by using the ordering of routers with respect to prefixes.

Computer and Communication System

Figure 14:
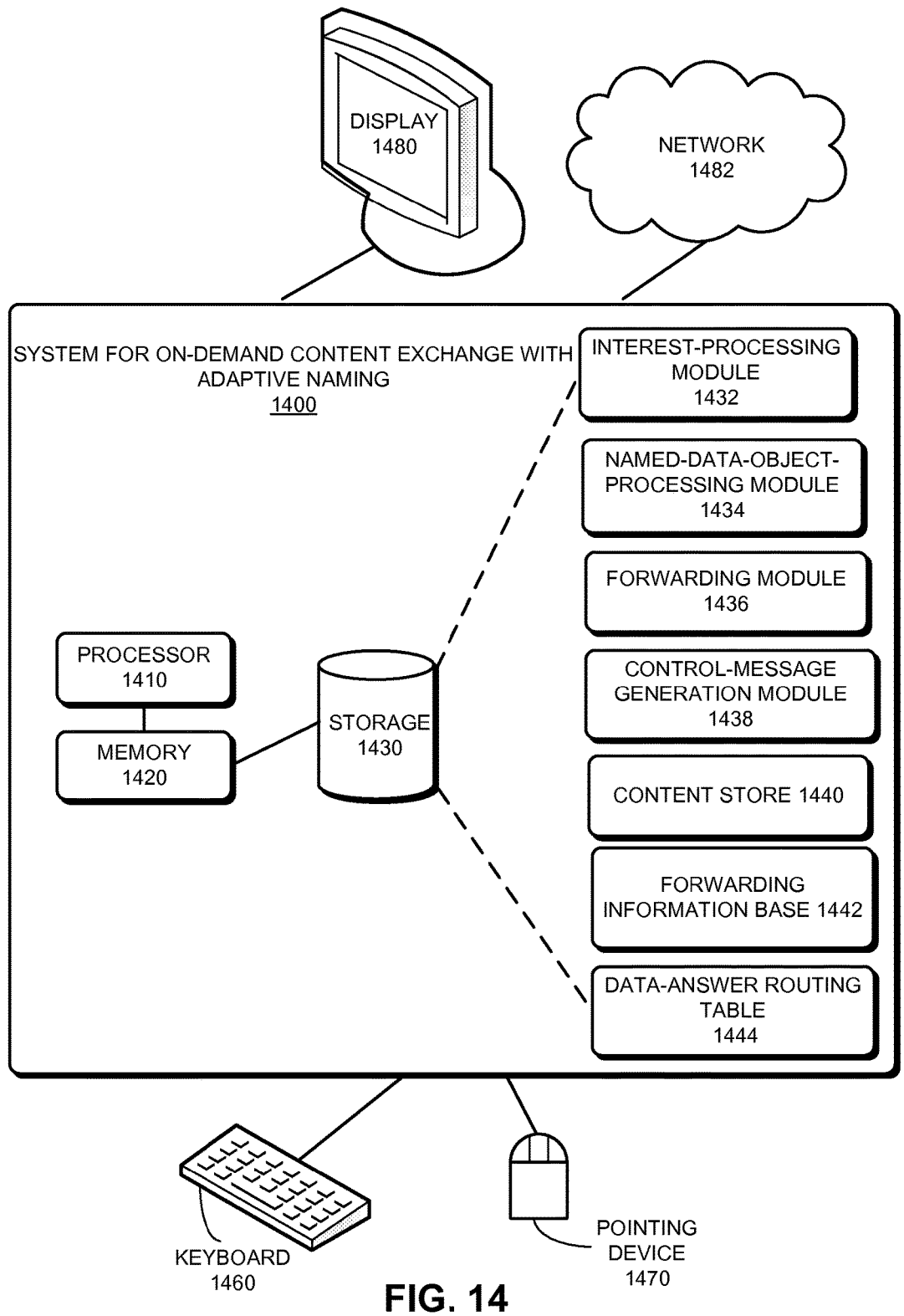
FIG. 14 illustrates an exemplary system for On-demand Content Exchange with Adaptive Naming (OCEAN), in accordance with an embodiment.

FIG. 14 illustrates an exemplary system for On-demand Content Exchange with Adaptive Naming, in accordance with an embodiment of the present invention. A system 1400 for On-demand Content Exchange with Adaptive Naming comprises a processor 1410, a memory 1420, and a storage 1430. Storage 1430 typically stores instructions that can be loaded into memory 1420 and executed by processor 1410 to perform the methods mentioned above. In one embodiment, the instructions in storage 1430 can implement an Interest-processing module 1432, a named-data-object-processing module 1434, a forwarding module 1436, and a control-message generation module 1438, all of which can be in communication with each other through various means. Storage 1430 can further comprise a number of data structures, such as a Content Store 1440, a Forwarding Information Base 1442, and a data-answer routing table 1444.

In some embodiments, modules 1432, 1434, 1436, and 1438 can be partially or entirely implemented in hardware and can be part of processor 1410. Further, in some embodiments, the system may not include a separate processor and memory. Instead, in addition to performing their specific tasks, modules 1432, 1434, 1436, and 1438, either separately or in concert, may be part of general- or special-purpose computation engines.

Storage 1430 stores programs to be executed by processor 1410. Specifically, storage 1430 stores a program that implements a system (application) for On-demand Content Exchange with Adaptive Naming. During operation, the application program can be loaded from storage 1430 into memory 1420 and executed by processor 1410. As a result, system 1400 can perform the functions described above. System 1400 can be coupled to an optional display 1480 (which can be a touchscreen display), keyboard 1460, and pointing device 1470, and can also be coupled via one or more network interfaces to network 1482.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for content exchange in an information-centric network (ICN), the method comprising:

receiving, by a first node in the ICN, an interest for content from a second node, wherein the interest indicates a name of the content and an incoming identifier assigned to the interest by the second node, wherein the incoming identifier is a concatenation of a predecessor token that indicates a previous-hop neighbor to the second node, a forwarding token, and an anchor token that indicates a destination node that advertises the content, and the forwarding token is assigned by the second node and is unique to a combination of the previous-hop neighbor to the second node, the first node, and the destination node, and wherein the received interest further indicates a hop count from the second node to the destination node that advertises the content;

determining, based on routing information stored on the first node and the hop count, whether a distance-based forwarding condition is met to determine whether the first node is closer to the destination node than the second node from which the interest was received, wherein in response to the distance-based forwarding condition not being met, dropping the interest and sending a control message back to the second node indicating that an interest loop is detected, and in response to the distance-based forwarding condition being met:

determining whether a matching entry is found in an identifier table stored on the first node that corresponds to the incoming identifier, wherein in response to the matching entry being found in the identifier table, the matching entry indicates a next-hop neighbor and an outgoing identifier, and in response to no matching entry corresponding to the incoming identifier being found in the identifier table:

identifying a next-hop neighbor based on the routing information stored on the first node; and creating an entry in the identifier table for the received interest, wherein creating the entry comprises generating an outgoing identifier, and the generated outgoing identifier indicates an outgoing forwarding token that is assigned by the first node and is unique to a combination of the second node, the next-hop neighbor, and the destination node that advertises the content;

updating the interest by replacing the incoming identifier with the outgoing identifier, wherein the outgoing identifier includes an outgoing predecessor token, an outgoing forwarding token, and an outgoing anchor token, the outgoing predecessor token is a same as the forwarding token assigned by the second node, and the outgoing forwarding token is assigned by the first node and is unique to a combination of the second node, the next-hop neighbor, and the destination node indicated by the outgoing anchor token;

forwarding the updated interest to the next-hop neighbor;

receiving, by the first node, a content object in response to the interest, wherein the content object includes a content identifier, wherein the content identifier includes, at least in part, the outgoing forwarding token assigned by the first node;

identifying a second matching entry in the identifier table stored on the first node that corresponds to the content identifier wherein the second matching entry indicates the second node and an identifier associated with the second node, wherein the identifier associated with the second node that is stored on the first node includes, at least in part, the forwarding token assigned by the second node;

updating the content object by replacing the content identifier with the previously received incoming identifier associated with the second node; and forwarding the updated content object to the second node.

2. The method of claim 1, wherein the entry in the identifier table has a lifetime that is decremented while the entry is stored in the identifier table.

3. The method of claim 2, wherein the entry is deleted when the lifetime reaches zero.

4. The method of claim 1, wherein the identifier table includes a mapping between the outgoing identifier and the content identifier.

5. The method of claim 1, wherein the outgoing identifier is a concatenation of the outgoing predecessor token, the outgoing forwarding token, and the anchor token.

6. The method of claim 1, wherein prior to creating the entry in the identifier table, determining a hop count from the first node to the destination node that advertises the content based on the routing information stored on the first node.

7. The method of claim 6, further comprising:

determining whether the distance-based forwarding condition is met based on the hop count from the first node to the destination node that advertises the content, wherein in response to the distance-based forwarding condition not being met, dropping the interest and sending a control message back to the second node indicating that an interest loop is detected, and in response to the distance-based forwarding condition being met, creating the entry in the identifier table.

8. A non-transitory, computer-readable storage medium storing instructions that, when executed by a computing device, cause the computing device to perform a method for content exchange in an information-centric network (ICN), the method comprising:

receiving, by the computing device in the ICN, an interest for content from a node, wherein the interest indicates a name of the content and an incoming identifier assigned to the interest by the node, wherein the incoming identifier is a concatenation of a predecessor token that indicates a previous-hop neighbor to the node, a forwarding token, and an anchor token that indicates a destination node that advertises the content, and the forwarding token is assigned by the node and is unique to a combination of the previous-hop neighbor to the node, the computing device, and the destination node, and wherein the received interest further indicates a hop count from the node to the destination node that advertises the content;

determining, based on routing information stored on the computing device and the hop count, whether a distance-based forwarding condition is met to determine whether the computing device is closer to the destination node than the node from which the interest was received, wherein in response to the distance-based forwarding condition not being met, dropping the interest and sending a control message back to the node indicating that an interest loop is detected, and in response to the distance-based forwarding condition being met:
  determining whether a matching entry is found in an identifier table stored on the computing device that corresponds to the incoming identifier, wherein in response to the matching entry being found in the identifier table, the matching entry indicates a next-hop neighbor and an outgoing identifier, and the outgoing identifier includes an outgoing predecessor token, an outgoing forwarding token, and an outgoing anchor token, the outgoing predecessor token is a same as the forwarding token assigned by the node, and the outgoing forwarding token is assigned by the computing device and is unique to a combination of the node, the next-hop neighbor, and the destination node indicated by the outgoing anchor token, and in response to no matching entry corresponding to the incoming identifier being found in the identifier table:
    identifying a next-hop neighbor based on routing information stored on the computing device; and
    creating an entry in the identifier table for the received interest, wherein creating the entry comprises generating an outgoing identifier, and the generated outgoing identifier indicates an outgoing forwarding token that is assigned by the computing device and is unique to a combination of the node, the next-hop neighbor, and the destination node that advertises the content;
updating the interest by replacing the incoming identifier with the outgoing identifier;
forwarding the updated interest to the next-hop neighbor;
receiving, by the computing device, a content object in response to the interest, wherein the content object includes a content identifier, wherein the content identifier includes, at least in part, the outgoing forwarding token assigned by the computing device;
identifying a second matching entry in the identifier table stored on the computing device that corresponds to the content identifier, wherein the second matching entry indicates the node and an identifier associated with the node, wherein the identifier associated with the node that is stored on the computing device includes, at least in part, the forwarding token assigned by the node;
updating the content object by replacing the content identifier with the previously received incoming identifier associated with the node; and
forwarding the updated content object to the node.

9. The computer-readable storage medium of claim 8, wherein the entry in the identifier table has a lifetime that is decremented while the entry is stored in the identifier table.

10. The computer-readable storage medium of claim 9, wherein the entry is deleted when the lifetime reaches zero.

11. The computer-readable storage medium of claim 8, wherein the identifier table includes a mapping between the outgoing identifier and the content identifier.

12. The computer-readable storage medium of claim 8, wherein the outgoing identifier is a concatenation of the outgoing predecessor token, the outgoing forwarding token, and the anchor token.

13. The computer-readable storage medium of claim 8, wherein prior to creating the entry in the identifier table, the method further comprises determining a hop count from the computing device to the destination node that advertises the content based on the routing information stored on the computing device.

14. The computer-readable storage medium of claim 8, the method further comprising:
  determining whether the distance-based forwarding condition is met based on the hop count from the computing device to the destination node that advertises the content, wherein in response to the distance-based forwarding condition not being met, dropping the interest and sending a control message back to the node indicating that an interest loop is detected, and in response to the distance-based forwarding condition being met, creating the entry in the identifier table.

15. A computer system for content exchange in an information-centric network (ICN), the system comprising:
  a memory for storing instructions for an interest-receiving module, an interest-processing module, a forwarding module, and a content-object processing module;
  a processor for executing the instructions, wherein executing the instructions causes the system to perform operations, comprising:
  the interest-receiving module is configured to receive, by a first node in the ICN, an interest for content from a second node, wherein the interest indicates a name of the content and an incoming identifier assigned to the interest by the second node, wherein the incoming identifier is a concatenation of a predecessor token that indicates a previous-hop neighbor to the second node, a forwarding token, and an anchor token that indicates a destination node that advertises the content, and the forwarding token is assigned by the second node and is unique to a combination of the previous-hop neighbor to the second node, the first node, and the destination node, and wherein the received interest further indicates a hop count from the second node to the destination node that advertises the content;
  the interest-processing module is configured to determine, based on routing information stored on the first node and the hop count, whether a distance-based forwarding condition is met to determine whether the first node is closer to the destination node than the second node from which the interest was received, wherein in response to the distance-based forwarding condition not being met, drop the interest and send a control message back to the second node indicating that an interest loop is detected, and in response to the distance-based forwarding condition being met:
    determine whether a matching entry is found in an identifier table stored on the first node that corresponds to the incoming identifier, wherein in response to the matching entry being found, the matching entry indicates a next-hop neighbor and an outgoing identifier, and in response to no matching entry corresponding to the incoming identifier being found in the identifier table:
      identify a next-hop neighbor based on the routing information stored on the first node; and
      create an entry in the identifier table for the received interest, wherein creating the entry comprises generating an outgoing identifier, and the generated outgoing identifier indicates an outgoing forwarding token that is assigned by the first node and is unique to a combination of the second node, the next-hop neighbor, and the destination node that advertises the content; and update the interest by replacing the incoming identifier with the outgoing identifier, wherein the outgoing identifier includes an outgoing predecessor token, an outgoing forwarding token, and an outgoing anchor token, the outgoing predecessor token is a same as the forwarding token assigned by the second node, and the outgoing forwarding token assigned by the first node and is unique to a combination of the second node, the next-hop neighbor, and a destination node indicated by the outgoing anchor token;

the forwarding module is configured to forward the updated interest to the next-hop neighbor; and the content-object processing module is configured to
receive, by the first node, a content object in response to the interest, wherein the content object includes a content identifier, wherein the content identifier includes, at least in part, the outgoing forwarding token assigned by the first node;

identify a second matching entry in the identifier table stored on the first node that corresponds to the content identifier, wherein the second matching entry indicates the second node and an identifier associated with the second node, wherein the identifier associated with the second node that is stored on the first node includes, at least in part, the forwarding token assigned by the second node; and update the content object by replacing the content identifier with the previously received incoming identifier associated with the second node, wherein the forwarding module is configured to forward the updated content object to the second node.

16. The system of claim 15, wherein the entry in the identifier table has a lifetime that is decremented while the entry is stored in the identifier table.

17. The system of claim 16, wherein the entry is deleted when the lifetime reaches zero.

18. The system of claim 15, wherein the identifier table includes a mapping between the outgoing identifier and the content identifier.

19. They system of claim 15, wherein the outgoing identifier is a concatenation of the outgoing predecessor token, the outgoing forwarding token, and the anchor token.

20. The system of claim 15, wherein the interest-processing module is further configured to:

determine a hop count from the first node to the destination node that advertises the content based on the routing information stored on the first node prior to creating the entry in the identifier table; and determine whether the distance-based forwarding condition is met based on the hop count from the first node to the destination node that advertises the content, wherein in response to the distance-based forwarding condition not being met, drop the interest and send a control message back to the second node indicating that an interest loop is detected, and in response to the distance-based forwarding condition being met, create the entry in the identifier table.

* * * * *